(12) United States Patent
Samuelsson et al.

(10) Patent No.: US 10,091,509 B2
(45) Date of Patent: Oct. 2, 2018

(54) CODING AND DERIVING QUANTIZATION PARAMETERS

(71) Applicant: Telefonaktiebolaget LM Ericsson (publ), Stockholm (SE)

(72) Inventors: Jonatan Samuelsson, Stockholm (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 108 days.

(21) Appl. No.: 15/426,689

(22) Filed: Feb. 7, 2017

(65) Prior Publication Data
US 2017/0150151 A1 May 25, 2017

Related U.S. Application Data

(63) Continuation of application No. 14/891,821, filed as application No. PCT/SE2015/051042 on Oct. 2, 2015, now Pat. No. 9,609,362.
(Continued)

(51) Int. Cl.
*H04N 19/169* (2014.01)
*H04N 19/124* (2014.01)
(Continued)

(52) U.S. Cl.
CPC ......... *H04N 19/124* (2014.11); *H04N 19/157* (2014.11); *H04N 19/176* (2014.11);
(Continued)

(58) Field of Classification Search
CPC .... H04N 19/124; H04N 19/44; H04N 19/176; H04N 19/186; H04N 19/70; H04N 19/157
See application file for complete search history.

(56) References Cited

U.S. PATENT DOCUMENTS 7,242,409 B2 * 7/2007 Cain ..................... G09G 5/02
345/589
7,342,682 B2 * 3/2008 Haikin ................. G06T 11/001
358/1.9
(Continued)

FOREIGN PATENT DOCUMENTS

CN 101356825 A 1/2009
TW 201304558 A 1/2013
(Continued)

OTHER PUBLICATIONS

Zhang et at. "SCCES Test 3.2.1: In-loop color-space transform", JCTVC-R0147, Jun. 30-Jul. 9, 2014 (Year: 2014).*
(Continued)

*Primary Examiner* — Sathyanaraya V Perungavoor
*Assistant Examiner* — Philip P. Dang
(74) *Attorney, Agent, or Firm* — Sage Patent Group

(57) ABSTRACT

QP control information valid for a block of samples is parsed. A QP to use for the block of samples is derived according to a first QP derivation process independent on the QP control information if residual data of the block of samples is not color transformed and according to a second QP derivation process dependent on the QP control information if the residual data of the block of samples is color transformed. The embodiments thereby decouple QP parameters for blocks of samples that are coded with color transform and those that are coded without color transform. This decoupling achieves better flexibility during encoding and results in better visual quality.

22 Claims, 10 Drawing Sheets

Related U.S. Application Data

(60) Provisional application No. 62/060,071, filed on Oct. 6, 2014.

(51) Int. Cl.

| | |
|---|---|
| *H04N 19/60* | (2014.01) |
| *H04N 19/176* | (2014.01) |
| *H04N 19/70* | (2014.01) |
| *H04N 19/186* | (2014.01) |
| *H04N 19/157* | (2014.01) |
| *H04N 19/44* | (2014.01) |
| *H04N 19/46* | (2014.01) |
| *H04N 19/61* | (2014.01) |
| *H04N 19/174* | (2014.01) |
| *H04N 19/184* | (2014.01) |

(52) U.S. Cl.
CPC ........... *H04N 19/186* (2014.11); *H04N 19/44* (2014.11); *H04N 19/46* (2014.11); *H04N 19/60* (2014.11); *H04N 19/61* (2014.11); *H04N 19/70* (2014.11); *H04N 19/174* (2014.11); *H04N 19/184* (2014.11)

(56) References Cited

U.S. PATENT DOCUMENTS

| | | | | |
|---|---|---|---|---|
| 7,480,417 | B2* | 1/2009 | Malvar | H04N 1/64 348/E9.01 |
| 7,792,370 | B2* | 9/2010 | Sun | H04N 19/105 348/272 |
| 7,911,648 | B2* | 3/2011 | Owens | H04N 1/6055 358/1.9 |
| 8,085,435 | B2* | 12/2011 | Hauf | H04N 1/60 358/1.9 |
| 8,170,333 | B2* | 5/2012 | Balster | G06T 9/00 382/166 |
| 8,170,334 | B2* | 5/2012 | Balster | H04N 19/647 382/166 |
| 8,170,335 | B2* | 5/2012 | Balster | H04N 19/647 382/166 |
| 8,248,486 | B1 | 8/2012 | Ward et al. | |
| 8,401,073 | B2* | 3/2013 | Yoshimatsu | H04N 19/42 375/240.03 |
| 8,576,439 | B2* | 11/2013 | Ming | G06F 3/1211 358/1.9 |
| 8,606,028 | B2* | 12/2013 | Noda | H04N 21/23892 382/232 |
| 8,660,178 | B2* | 2/2014 | Berbecel | H04N 21/2365 375/240.03 |
| 2006/0088105 | A1* | 4/2006 | Shen | H04N 19/197 375/240.21 |
| 2007/0052986 | A1* | 3/2007 | Spaulding | H04N 1/6058 358/1.9 |
| 2009/0168894 | A1 | 7/2009 | Marpe et al. | |
| 2009/0316793 | A1* | 12/2009 | Yang | H04N 19/172 375/240.24 |
| 2010/0266042 | A1* | 10/2010 | Koo | H04N 19/597 375/240.16 |
| 2011/0150078 | A1 | 6/2011 | Reznik et al. | |
| 2012/0079329 | A1 | 3/2012 | Steinbach et al. | |
| 2012/0163467 | A1* | 6/2012 | Kim | G06T 9/007 375/240.16 |
| 2013/0027230 | A1* | 1/2013 | Marpe | H03M 7/4006 341/107 |
| 2013/0321675 | A1* | 12/2013 | Cote | H04N 9/64 348/242 |
| 2014/0003527 | A1* | 1/2014 | Tourapis | H04N 19/00424 375/240.16 |
| 2014/0003528 | A1* | 1/2014 | Tourapis | H04N 19/30 375/240.16 |
| 2014/0210652 | A1* | 7/2014 | Bartnik | H03M 7/40 341/67 |
| 2014/0286400 | A1* | 9/2014 | Joshi | H04N 19/70 375/240.03 |
| 2015/0181214 | A1 | 6/2015 | Alshina et al. | |
| 2015/0264354 | A1 | 9/2015 | Zhang et al. | |
| 2015/0373327 | A1 | 12/2015 | Zhang et al. | |

FOREIGN PATENT DOCUMENTS

| | | |
|---|---|---|
| TW | 201415907 A | 4/2014 |
| WO | WO 2006/009400 A1 | 1/2006 |
| WO | WO 2014/205363 A1 | 12/2014 |
| WO | WO 2015/143671 A1 | 10/2015 |
| WO | WO 2015/187978 A1 | 12/2015 |
| WO | WO 2016/051643 A1 | 4/2016 |

OTHER PUBLICATIONS

International Search Report and Written Opinion of the International Searching Authority, Application No. PCT/SE2015/051042, dated Feb. 11, 2016.

English language translation of Notice of Reasons for Rejection, JP Application No. 2016-538085, dated Nov. 8, 2016, 5 pp.

Taiwanese Office Action Corresponding to Application No. 104132913; dated Nov. 1, 2016; Foreign Text Only, 9 Pages.

Bordes et al., "Content-Adaptive Color Transform for HEVC", *IEEE 2013 Picture Coding symposium*, San Jose, CA, Dec. 8-11, 2013, pp. 245-248.

Li et al., "Fix for adaptive color space coding in JCTVC-Q0035", *Joint Collaborative Team on Video Coding (JCT-VC) of ITU-T SG 16 WP3 and ISO/IEC JTC 1/SC 29/WG 11*, 17th Meeting: Valencia, Spain, Mar. 27-Apr. 4, 2014, Document: JCTVC-Q0213_r1, 5 pp.

Li et al., "On residual adaptive colour transform", *Joint Collaborative Team on Video Coding (JCT-VC) of ITU-T SG 16 WP3 and ISO/IEC JTC 1/SC 9/WG 11*, 19th Meeting: Strasbourg, France, Oct. 17-24, 2014, Document: JCTVC-50086, 15 pp.

Zhang et al., "SCCE5 Test 3.2.1: In-loop color space transform", *Joint Collaborative Team on Video Coding (JCT-VC) of ITU-T SG 16 WP3 and ISO/IEC JTC 1/SC 29/WG 11*, 18th Meeting: Sapporo, Japan, Jul. 30-Jul. 9, 2014, Document: JCTVC-R0147, 8 pp.

Extended European Search Report for European Patent Application No. 15848181.2 dated Sep. 18, 2017.

Joshi, "Working Draft 1 of HEVC Screen Content Coding," MPEG Meeting, Coding of Moving Pictures and Associated Audio Information, International Organization for Standardization, pp. 1-360 (2014).

Flynn et al., "RExt: CU-adaptive chroma QU offsets," pp. 1-5 (Oct. 2013).

Sjoberg et al., "QP offset for Adaptive Colour Transform," JCT-VC Meeting, pp. 1-3 (Oct. 2014).

\* cited by examiner

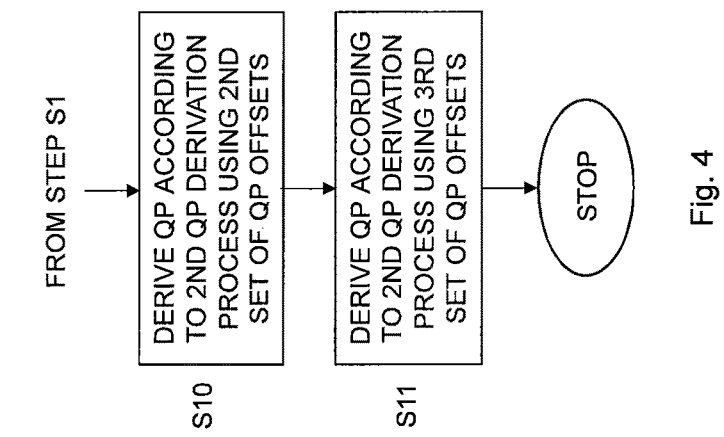
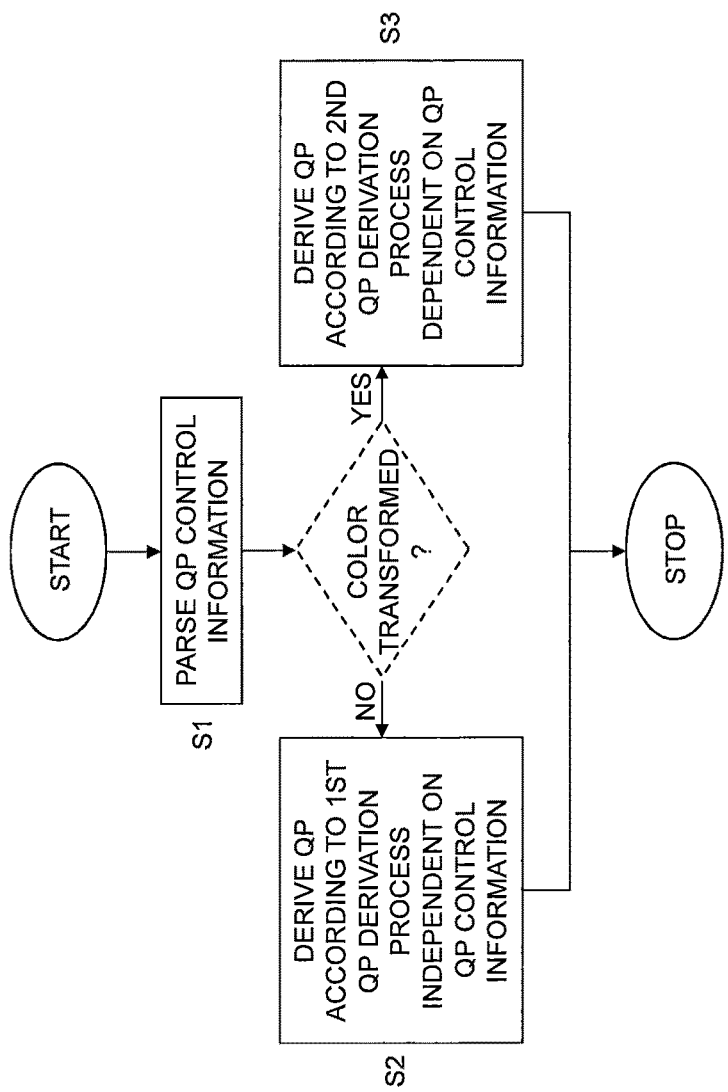
Fig. 4
Fig. 3

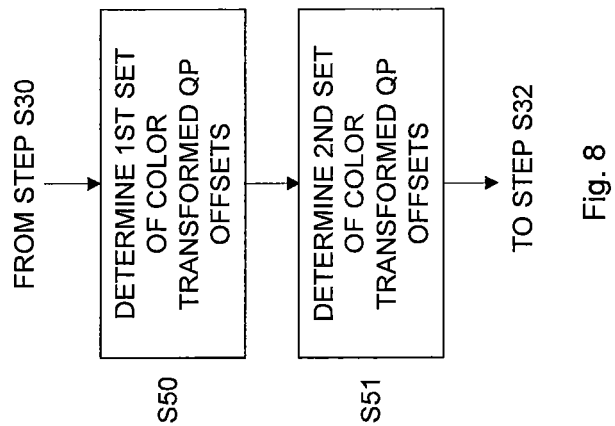
Fig. 8
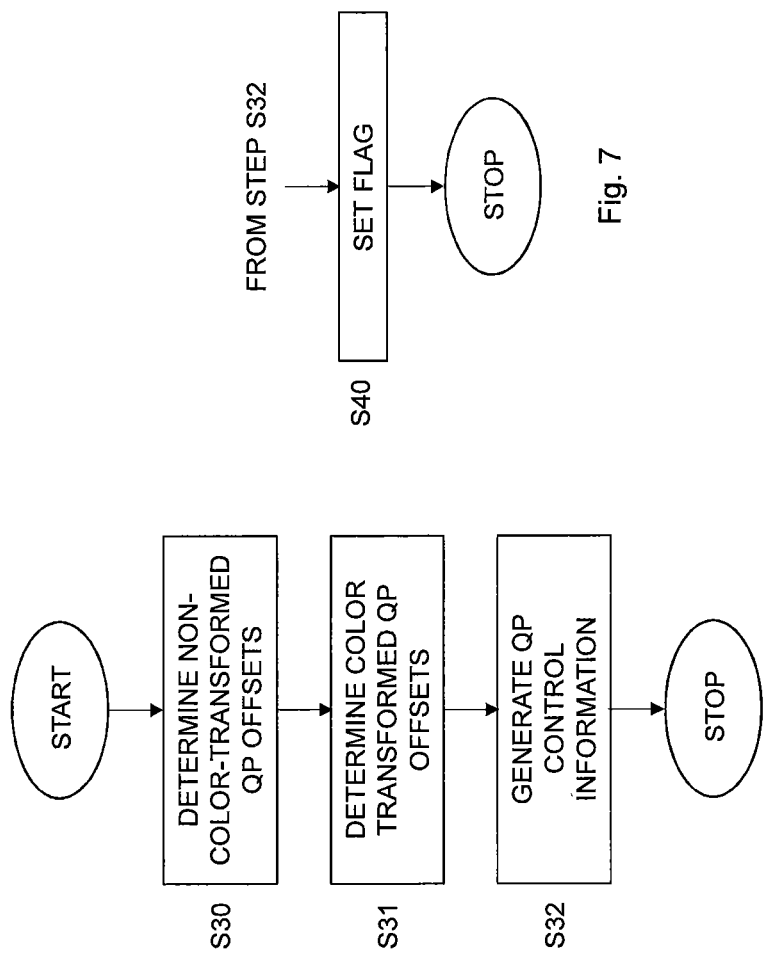
Fig. 7
Fig. 6

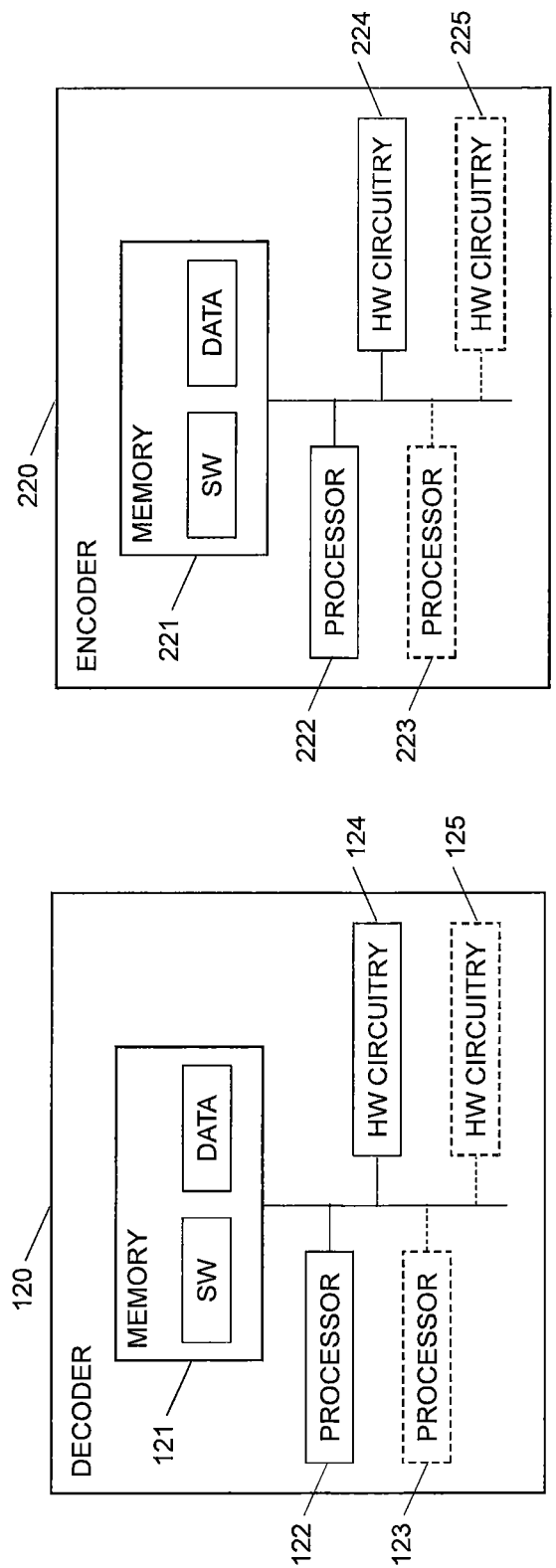

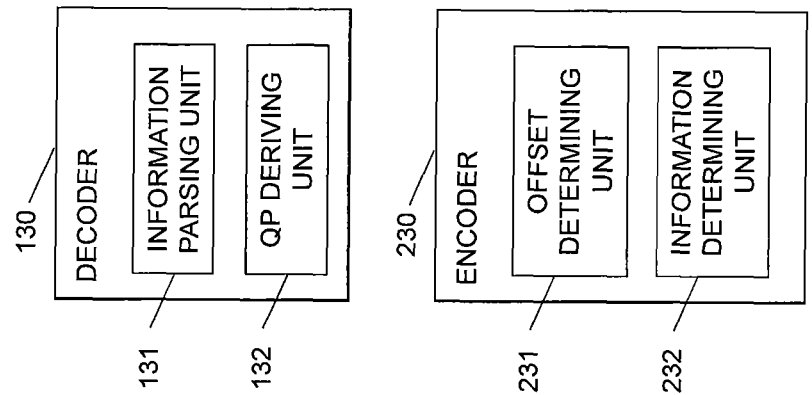
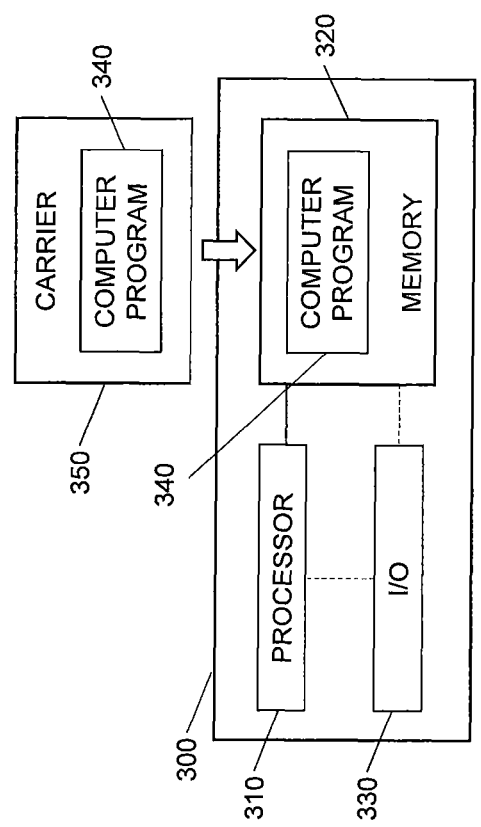

CODING AND DERIVING QUANTIZATION PARAMETERS

CROSS REFERENCE TO RELATED APPLICATIONS

This application is a continuation of U.S. patent application Ser. No. 14/891,821, filed Nov. 17, 2015, which itself is a 35 U.S.C. § 371 national stage application of PCT International Application No. PCT/SE2015/051042, filed on Oct. 2, 2015, which itself claims priority to U.S. provisional Patent Application No. 62/060,071, filed Oct. 6, 2014, the disclosure and content of all of which are incorporated by reference herein in their entireties.

TECHNICAL FIELD

The present embodiments generally relate to coding and deriving quantization parameters, and in particular to coding and deriving quantization parameters for color transformed blocks of samples.

BACKGROUND

Moving Picture Experts Group (MPEG) by International Organization for Standardization/International Electrotechnical Commission (ISO/IEC) and Video Coding Experts Group (VCEG), sometimes denoted Visual Coding Experts Group, by International Telecommunication Union (ITU) Telecommunication Standardization Sector (ITU-T) are currently jointly standardizing a Screen Content Coding (SCC) codec built on top of High Efficiency Video Coding (HEVC), also defined as ISO/IEC 23008-2 MPEG-H Part 2 and ITU-T H.265. HEVC is a block based video coding standard that exploits temporal and spatial prediction in order to accomplish efficient compression. A Coding Unit (CU) is a square block of sample values and can be further divided into Prediction Units (PUs) and Transform Units (TUs). The TU holds residual data that, during decoding, is added to a prediction that is performed in the block. The residual data consists of zero or more coefficients that are quantized using a quantization parameter (QP). A low QP value means that the quantization step is small, which will result in good visual quality but high bitrate. A high QP value means that the quantization step is large, which will result in bad visual quality but low bitrate.

HEVC includes several data structures for high level information and parameters. The Sequence Parameter Set (SPS) is a data structure that contains parameters and information that is valid at least for an entire sequence. The Picture Parameter Set (PPS) contains parameters and information that is valid at least for a picture. A picture is partitioned into one or more slices and the slice header contains parameters and information that is valid for one slice.

It is likely that the SCC codec will be expressed as a profile in an upcoming version of the HEVC specification. The SCC codec is specifically targeting applications in which the videos include a substantial amount of text and graphics, such as screen sharing and remote desktops. The current draft of the SCC codec includes several new tools that are specialized for this type of content; Intra Block Copy, Palette Mode and Adaptive Color Transform (ACT).

With ACT it is possible to transform residual data in the encoding process to a different color space that has improved decorrelation between the color channels and thereby can provide better compression efficiency. The process of transforming data of one or more blocks from one color space to another is called color transformation. A block for which color transformation has been done is denoted as a block that is color transformed or simply color transformed block. A particular transformation process is called color transform. When ACT is enabled, there is a flag for each block telling the decoder whether or not the residual data of that block should be color transformed before it is added to the prediction.

Uncompressed digital color video is typically represented as a series of pictures with three color components. The color components can also be called color channels. For each spatial position in each picture the sample, i.e. pixel, is represented by a triplet, in which each value in the triplet represents the magnitude of the corresponding color in that position. The colors are typically expressed with a fixed number of bits, such as 8 giving values 0-255 or 10, giving values 0-1023. The data structure that holds the color values for one color component is typically called a sample array.

The SCC codec is currently only defined for 4:4:4 color but it can be used with several different color formats, such as Luminance, Chroma Blue, Chroma Red (YCbCr) or Green, Blue, Red (GBR). When used with GBR, Green data is stored in the Y sample array, Blue data is stored in the Cb sample array and Red data is stored in the Cr sample array. GBR is the same thing as RGB but with a different order among the color components. Treating the Green component as the primary color component is beneficial from a coding efficiency point of view.

When ACT is applied to residual GBR data the colors should be transformed from a Green, Blue, Red representation to a Luminance, Chroma Orange, Chroma Green (YCoCg) representation in the encoder. In the decoder the GBR representation is retrieved from the YCoCg representation through the use of the following formula for lossless coding, i.e. when cu_transquant_bypass_flag is equal to 1:

$$tmp = Y - (Cg >> 1)$$

$$Y = tmp + Cg$$

$$Cb = tmp - (Co >> 1)$$

$$Cr = Cg + Co$$

For lossy coding, i.e. when cu_transquant_bypass_flag is equal to 0, the following formula is used instead:

$$tmp = Y - Cg$$

$$Y = Y + Cg$$

$$Cb = tmp - Co$$

$$Cr = tmp + Co$$

When ACT is used with GBR data, Luminance data is stored in the Y sample array, Chroma Green data is stored in the Cb sample array and Chroma Orange data is stored in the Cr sample array.

In HEVC, and in the current draft of the SCC codec, it is possible to change quantization parameter (QP) on CU level, The QP for luma (Y), Chroma Blue (Cb) and Chroma Red (Cr) can be set differently using parameters that applies for at least the entire slice, e.g. pps_cb_qp_offset, pps_cr_qp_offset, and slice_cr_qp_offset. When different QPs are used for different color components it is said that there is a QP offset. At high QP levels there is a fixed, i.e. predefined, QP offset defined to provide better visual quality of low bitrate video.

It is also possible to change the QP differences, i.e. QP offsets, between the color channels from one CU to the next CU using a feature called "CU adaptive chroma QP-offsets". In this mode, the QP offset for each chroma channel can be selected per CU from up to six predefined values.

When ACT is applied there is a fixed, i.e. predefined, QP offset defined to compensate for that the color transform is not normalized. This means that the QP values for the three color channels for non-color-transformed blocks are defined as QP for luma Y=$Qp'_Y$, QP for chroma Cb=$Qp'_{Cb}$ and QP for chroma Cr=$Qp'_{Cr}$, whereas corresponding QP values for color transformed blocks are QP for luma Y=$Qp'_Y$−5, QP for chroma Cb=$Qp'_{Cb}$−5 and QP for chroma Cr=$Qp'_{Cr}$−3, see equations 8-261 to 8-263 in section 8.6.2 Scaling and transformation process, page 165, in Joint Collaborative Team on Video Coding (JCT-VC) of ITU-T SG 16 WP 3 and ISO/IEC JTC 1/SC 29/WG 11, Document: JCTVC-R1005-v3, High Efficiency Video Coding (HEVC) Screen Content Coding: Draft 1, 18th Meeting: Saporo, JP, 30 Jun.-9 Jul. 2014.

There is still a need for improvement with regard to coding and determination of quantization parameters, and in particular in connection with color transformation.

SUMMARY

An object of the embodiments is to achieve a solution for improved video compression.

This and other objects are met by embodiments as disclosed herein.

An aspect of the embodiments relates to a quantization parameter (QP) deriving method, The method comprises parsing QP control information valid for a block of samples. A QP to use for at least one color component of the block of samples is derived according to a first QP derivation process independent on the QP control information if residual data of the block of samples is not color transformed. However, if the residual data of the block of samples is color transformed the QP to use for the at least one color component of the block of samples is derived according to a second QP derivation process dependent on the QP control information.

Another aspect of the embodiments relates to a decoder. The decoder is configured to parse QP control information valid for a block of samples. The decoder is also configured to derive a QP to use for at least one color component of the block of samples according to a first QP derivation process independent on the QP control information if residual data of the block of samples is not color transformed. The decoder is further configured to derive the QP to use for the at least one color component of the block of samples according to a second QP derivation process dependent on the QP control information if the residual data of the block of samples is color transformed.

A related aspect of the embodiments defines a decoder. The decoder comprises an information parsing unit for parsing QP control information valid for a block of samples. The decoder also comprises a QP deriving unit for deriving a QP to use for at least one color component of the block of samples according to a first QP derivation process independent on the QP control information if residual data of the block of samples is not color transformed and deriving the QP for use to the at least one color component of the block of samples according to a second QP derivation process dependent on the QP control information if the residual data of the block of samples is color transformed.

A further aspect of the embodiments relates to a method for QP coding. The method comprises determining non-color-transformed QP offsets valid if residual data of a block of samples is not color transformed. The method also comprises determining color transformed GP offsets valid if residual data of a block of samples is color transformed. The method further comprises generating QP control information included in an encoded bitstream based on the non-color-transformed QP offsets and the color transformed QP offsets.

Yet another aspect of the embodiments relates to an encoder. The encoder is configured to determine non-color-transformed QP offsets valid if residual data of a block of samples is not color transformed. The encoder is also configured to determine color transformed QP offsets valid if residual data of a block of samples is color transformed. The encoder is further configured to generate QP control information included in an encoded bitstream based on the non-color-transformed QP offsets and the color transformed QP offsets.

A related aspect of the embodiments defines an encoder. The encoder comprises an offset determining unit for determining non-color-transformed QP offsets valid if residual data of a block of samples is not color transformed and color transformed QP offsets valid if residual data of a block of samples is color transformed. The encoder also comprises an information generating unit for generating QP control information included in an encoded bitstream based on the non-color-transformed QP offsets and the color transformed QP offsets.

A further aspect of the embodiments relates to a computer program comprising instructions, which when executed by at least one processor, cause the at least one processor to parse QP control information valid for a block of samples. The at least one processor is also caused to derive a QP to use for at least one color component of the block of samples according to a first QP derivation process independent on the QP control information if residual data of the block of samples is not color transformed. The at least one processor is further caused to derive the QP to use for the at least one color component of the block of samples according to a second QP derivation process dependent on the QP control information if the residual data of the block of samples is color transformed.

Another aspect of the embodiments relates to a computer program comprising instructions, which when executed by at least one processor, cause the at least one processor to determine non-color-transformed QP offsets valid if residual data of a block of samples is not color transformed. The at least one processor is also caused to determine color transformed QP offsets valid if residual data of a block of samples is color transformed. The at least one processor is further caused to generate QP control information included in an encoded bitstream based on the non-color-transformed QP offsets and the color transformed QP offsets.

A related aspect of the embodiments defines a computer-program product comprising a computer-readable medium having stored thereon a computer program according to above.

Another related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The present embodiments apply separate parameters for explicit QPs when the residual data of a block of samples is color transformed as compared to when the residual data is not color transformed. This lo makes it possible to have different explicit QP offset relations between the color components for blocks of samples that are using color transform as compared to blocks of samples that do not use color transform. Such a decoupling of deriving QPs provides better control and flexibility during encoding and produces good visual quality.

BRIEF DESCRIPTION OF THE DRAWINGS

The embodiments, together with further objects and advantages thereof, may best be understood by making reference to the following description taken together with the accompanying drawings, in which:

FIG. 3 is a flow chart illustrating a QP deriving method according to another embodiment;

FIG. 4 is a flow chart illustrating an embodiment of the deriving step S3 in FIG. 3;

FIG. 6 is a flow chart illustrating a method for QP coding according to an embodiment;

FIG. 7 is a flow chart illustrating an additional, optional step of the method shown in FIG. 6 according to an embodiment;

FIG. 8 is a flow chart illustrating an embodiment of the determining step S31 in FIG. 6;

FIG. 14 is a schematic block diagram of a decoder according to a further embodiment;

FIG. 15 is a schematic block diagram of an encoder according to a further embodiment;

FIG. 16 schematically illustrated a computer program based implementation of the embodiments;

FIG. 17 is a schematic block diagram of a decoder according to yet another embodiment;

FIG. 18 is a schematic block diagram of an encoder according to yet another embodiment;

DETAILED DESCRIPTION

Throughout the drawings, the same reference numbers are used for similar or corresponding elements.

The present embodiments generally relate to coding and determination of quantization parameters, and in particular to coding and determination of quantization parameters for color transformed blocks of samples.

The present embodiments thereby enable determination and usage of quantization parameters (QPs) that are adapted to and specific for color transformed blocks of samples. This means that different QP values can be used for color transformed blocks of samples in a video stream as compared to blocks of samples in the video stream that are not color transformed. By decoupling the QP values for blocks of samples that are coded with color transform and those that are coded without color transform, a better control and flexibility in the encoding process is achieved. Furthermore, the visual quality of the video is generally improved.

The embodiments thereby enable using different QP offset values between color components if the sample arrays carry, for instance, GBR color components as compared to if the sample arrays instead carry, for instance, YCbCr or YCoCg color components. Such an approach is not possible according to the prior art, which instead used the same QP offset values for both color transformed blocks of samples and non-color-transformed blocks of samples within a same picture or a slice of a picture.

Figure 1:
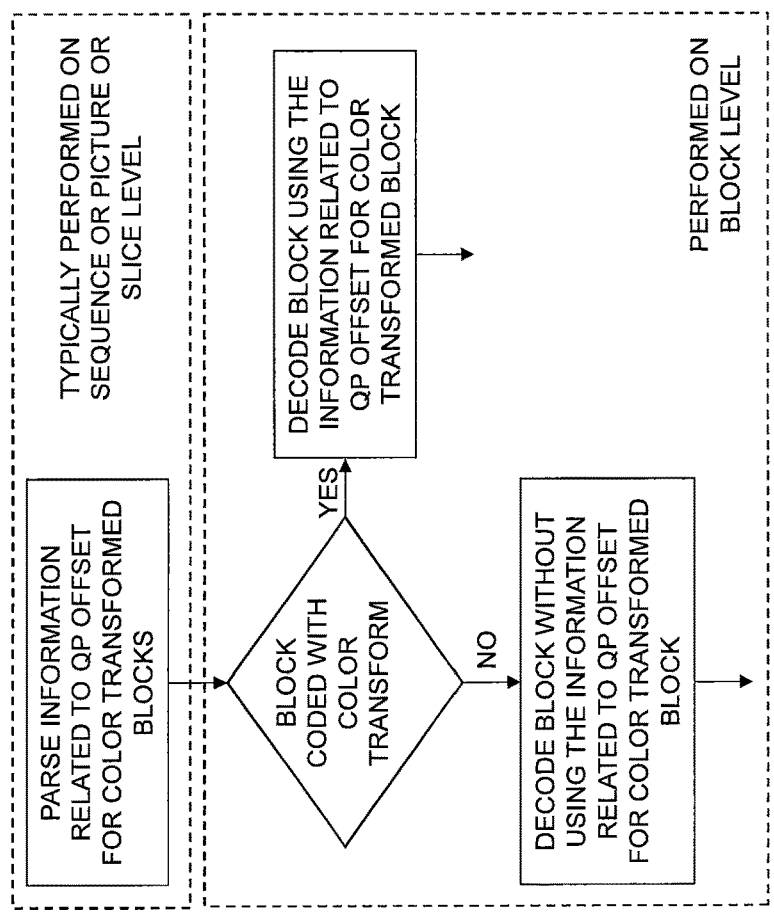
FIG. 1 is a flow chart illustrating a QP deriving method according to an embodiment.

FIG. 1 schematically illustrates a QP deriving method according to an embodiment. The method comprises parsing information related to QP offset for color transformed blocks. This step is typically performed on sequence, picture or slice level. In the first case, the information related to QP offset is preferably parsed from a Sequence Parameter Set (SPS) and in the second case from a Picture Parameter Set (PPS). In the third case, the information related to QP offset is preferably parsed from a slice header. The following steps are then performed on a block level, i.e. for each block of samples in a slice of a picture of a video stream. If a current block of samples is color transformed the block of samples is decoded using the information related to QP offset for color transformed blocks. However, if the current block of samples is not color transformed, then the block of samples is decoded without using the information related to QP offset for color transformed blocks.

Figure 2:
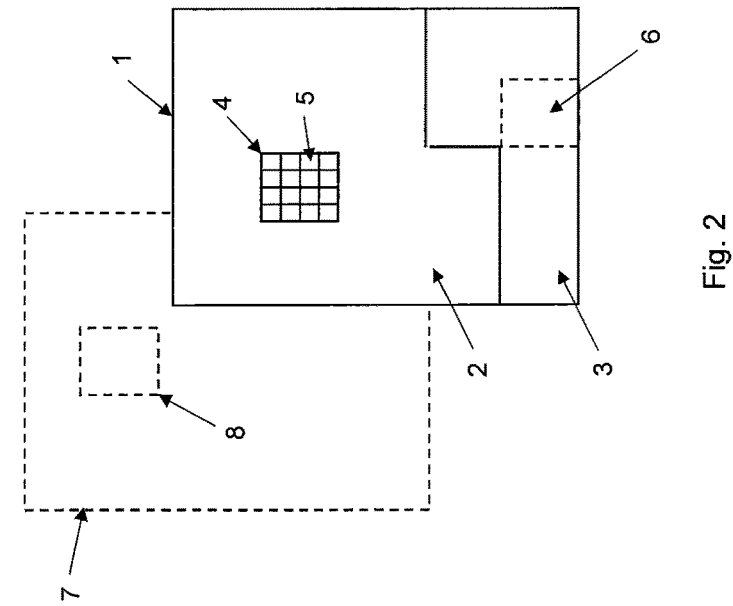
FIG. 2 schematically illustrates pictures of a video stream.

FIG. 2 schematically illustrate two pictures 1, 7 of a video stream. A picture 1 may divided into one or multiple, i.e. at least two, slices 2, 3. Each such slice 2, 3 then comprises one or, typically, more blocks 4, 6 of samples 5, i.e. pixels.

Generally, in video coding a block 4 of samples 5, typically denoted coding unit (CU), constituting a portion of a slice 2 of a picture 1 of a video stream, is divided into one or more prediction units (PUs) of a same size, in terms of number of samples, as the current CU or for a portion of the current CU. A respective intra prediction mode or inter prediction is then selected for each such PU. The difference between the sample values in the CU and the selected predictions is calculated to get one or more residual blocks of residual data, i.e. prediction error values. A transform is then applied in transform units (TUs) on the residual data with the same size as the CU or for a portion of the residual data to get one or more TUs of samples having a respective transform coefficient. The transform coefficients are then quantized using a QP and encoded. During decoding, the encoded data is decoded and dequantized using the QP to get the TU(s) or rather reconstructed version(s) of the TU(s). The TU(s) is(are) inverse transformed to get reconstructed or decoded residual data. The reconstructed or decoded residual data is added to the prediction(s) to get a reconstructed version of the CU.

In FIG. 2, a block 8 of samples in another picture 7 of the video stream is used as inter prediction for the current block 4 of samples 5 in the current picture 1.

FIG. 3 is a flow chart illustrating a QP deriving method according to an embodiment. The method comprises parsing, in step S1, QP control information valid for a block of samples. If residual data of the block of samples is not color transformed, i.e. the block of samples is not color transformed, the method continues to step S2. This step S2 comprises deriving a QP to use for at least one color component of the block of samples according to a first QP derivation process independent on the QP control information. However, if the residual data of the block of samples is color transformed, i.e. the block of samples is color transformed, the method instead continues from step S1 to step S3. Step S3 comprises deriving the QP to use for the at least one color component of the block of samples according to a second QP derivation process dependent on the QP control information.

Hence, in the QP deriving method two different QP derivation processes are used dependent on whether the residual data of the block of samples is color transformed or not. One of the two QP derivation processes is independent on, i.e. does not use, the QP control information parsed in step S1, whereas the other QP derivation process is dependent on, i.e. uses, the QP control information parsed in step S1.

This means that different QP values can be derived for color transformed blocks of samples as compared to non-color-transformed blocks of samples even within a same slice of a picture.

As mentioned in the background section, a coding unit (CU) is a block of sample values that can further be divided into prediction units (PUs) and transform units (TUs). The TU holds the residual data that is, during decoding, added to the prediction to in order to get a decoded version of the block of samples. A block of samples as used herein could, in an embodiment, be in the form of a CU. In another embodiment, a block of samples is in the form of a TU. In the former case, i.e. CU, each sample of the CU comprises, for each color component, a color component value. In the latter case, i.e. TU, each sample of the TU comprises, for each color component, a transform coefficient.

In an embodiment, step S2 of FIG. 3 is performed for a first block of samples and step S3 is performed for a second block of samples in a picture. In such a case, the first and second block of samples may belong to the same slice of the picture or they may belong to different slices of the picture.

In such an embodiment, the method as shown in FIG. 3 comprises parsing, in step S1, QP control information valid for a picture 1, see FIG. 2, comprising blocks 4, 6 of samples 5. Step S2 comprises deriving a QP to use for at least one color component of a first block 6 of samples 5 in the picture 1 according to a first QP derivation process independent on the QP control information. Correspondingly, step S3 comprises deriving the QP to use for the at least one color component of a second block 4 of samples 5 in the picture 1 according to a second QP derivation process dependent on the QP control information. In this embodiment, residual data of the first block 6 of samples 5 is not color transformed, whereas residual data of the second block 4 of samples 5 is color transformed.

Thus, the first block 6 of samples 5 is not color transformed and the QP derived for this first block 6 of samples 5 is thereby independent on the QP control information parsed in step S1 and uses the first QP derivation process. In clear contrast, the second block 4 of samples 5 is color transformed and the QP derived for this second block 4 of samples 5 is dependent on the QP control information parsed in step. S1 and uses the second QP derivation process.

In an embodiment, step S2 of FIG. 3 comprises deriving the QP to use for the at least one color component of the block of samples according to the first QP derivation process independent on the QP control information if a flag indicating whether the residual data of the block of samples is color transformed is equal to zero. In this embodiment, step S3 preferably comprises deriving the QP to use for the at least one color component of the block of samples according to the second QP derivation process dependent on the QP control information if the flag is equal to one.

Hence, in this embodiment a flag is used to signal whether a block of samples is color transformed or not, i.e. whether the residual data of the block of samples is color transformed or not.

A flag is a syntax element of one bit and can thereby assume either the value zero ($0_{bin}$) or the value one ($1_{bin}$). Hence, when ACT is enabled, preferably by setting a value of a flag residual adaptive_color transform_enabled_flag in an PPS or SPS equal to one, each block of samples has a respective flag to signal whether the residual data of the block of samples is color transformed or not.

In an embodiment, the flag is denoted cu_residual_act_flag. In such a case, the block of samples is preferably a CU. In another embodiment, the flag is denoted tu_residual_act_flag. In such a case, the block of samples is preferably a TU. In this latter embodiment, the presence of the flag can be conditioned on whether there is any non-zero residual data for the TU. Thus, if the TU does not contain any non-zero residual data, there is no residual data to color transform and there is no need determine any QP for the TU.

In an embodiment, the method also comprises the step of parsing the flag indicating whether the residual data of the block of samples is color transformed. In such a case, the flag is parsed from the encoded bitstream and preferably from the part of the encoded bitstream comprising the coded payload data for the blocks of samples in slice(s) of a picture.

In an embodiment, step S1 comprises parsing at least three sets of different QP offset parameters. In such a case, step S2 preferably comprises deriving the QP to use for the at least one color component according to the first QP derivation process and using a first set of QP offset parameters of the at least three sets of different QP offset parameters. Correspondingly, step S3 preferably comprises deriving the QP to use for the at least one color component according to the second QP derivation process and using a second set or a third set of QP offset parameters of the at least three sets of different QP offset parameters.

Thus, in this embodiment the QP control information parsed in step S1 is in the form of QP offset parameters. Furthermore, different sets of QP offset parameters are available and used depending on whether a block of samples is color transformed or not, Thus, the first set of QP offset parameters is used in step S2 for non-color-transformed block of samples. In this embodiment, two sets of QP offset parameters are available for color transformed block of samples and one of them is used in step S3 for a given block of samples.

Each set of QP offset parameters preferably comprises QP offset parameters parsed from a picture parameter set and/or QP offset parameters parsed from a slice header. This will be further described herein.

FIG. 4 is a flow chart illustrating a particular embodiment of step S3 in FIG. 3. The method, thus, continues from step S1 for color transformed blocks of samples. In this embodiment, step S10 comprises deriving the QP to use for the at least one color component of a first block of samples according to the second QP derivation process and using the second set of QP offset parameters. Step S11 comprises deriving the QP to use for the at least one color component of a second block of samples according to the second QP derivation process and using the third set of QP offset parameters. The first block of samples and the second block of samples belong to different pictures or slices.

Thus, color transformed blocks of samples belonging to different slices and/or different pictures of a encoded bitstream may use different sets of QP offset parameters. This is possible by signaling the QP offset parameters on a picture level, i.e. in the PPS, and/or on a slice level, i.e. in the slice header. In such a case, different pictures in the encoded bitstream may refer to different PPSs. Correspondingly, each slice in a picture has a respective slice header that may contain QP offset parameters.

In such a case, step S10 is performed for color transformed blocks of samples in a first slice of a picture or in a first picture of the encoded bitstream, whereas step S11 is performed for color transformed blocks of samples in a second slice of the picture or in a second picture of the encoded bitstream. Please note that any non-color-transformed blocks of samples in the first or second slice or in the first or second picture are processed according to step S2 in FIG. 3 and not according to step S10 or S11 in FIG. 4.

In an embodiment, step S1 of FIG. 3 comprises parsing the QP control information from PPS information valid for a picture comprising the block of samples and/or slice header information valid for a slice of the picture. In such a case, the slice comprises the block of samples.

In a particular embodiment, step S1 comprises parsing QP offset parameters from the PPS information and/or QP offset parameters from the slice header information.

Figure 5:
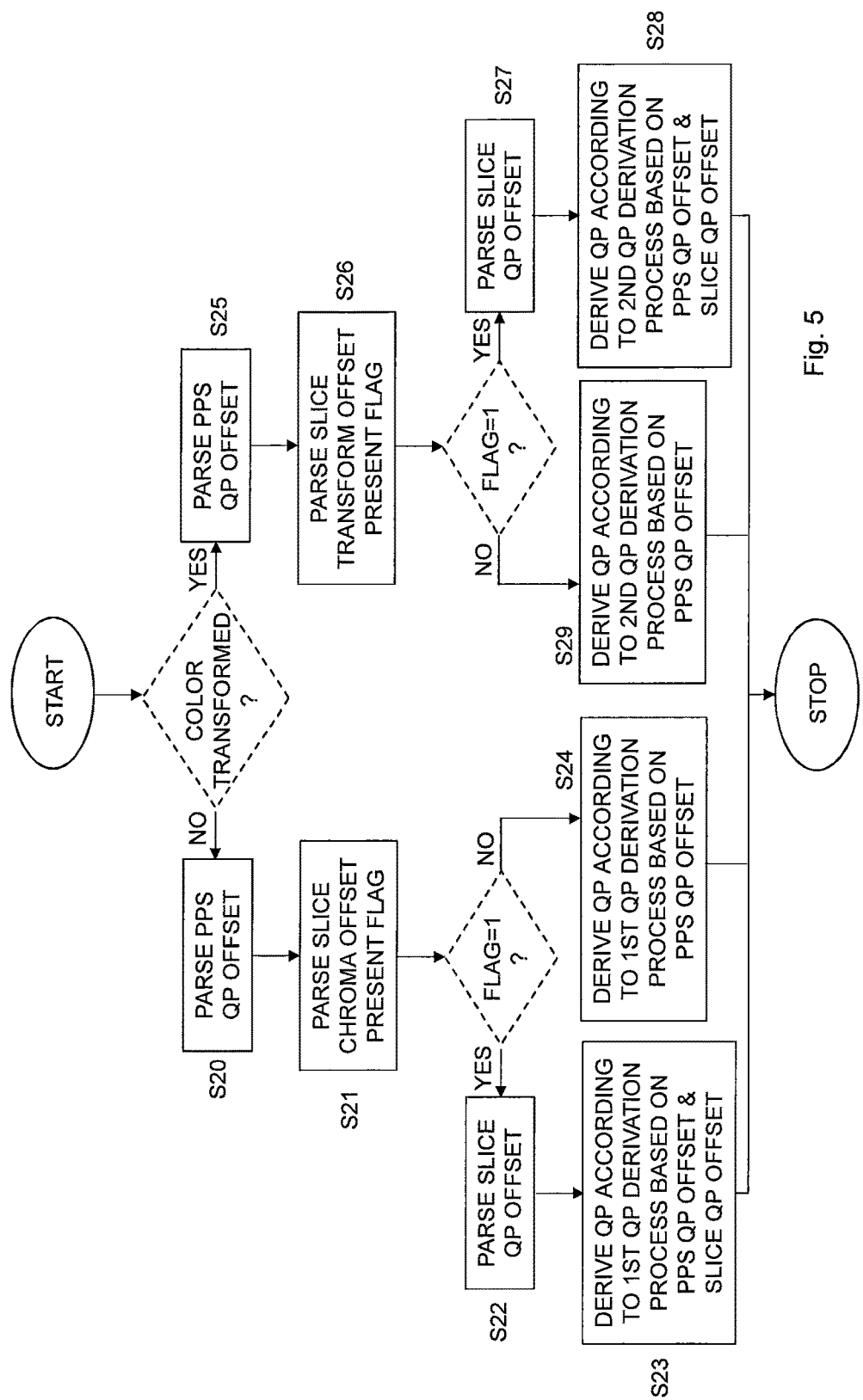
FIG. 5 is a flow chart illustrating a particular implementation example of QP deriving method according to an embodiment.

FIG. 5 is a flow chart illustrating a particular implementation example of the QP deriving method according to an embodiment. In this embodiment, parsing the QP control information comprises the steps S25-S27 shown in FIG. 5. Step S25 comprises parsing QP offset syntax element valid for color transformed blocks of samples from a PPS valid for a picture comprising the block of samples. Step S26 comprises parsing a slice transformed offset present flag from the PPS. If the slice transformed offset present flag is equal to one the method continues to step S27. This step S27 comprises parsing a QP offset syntax element valid for color transformed blocks of samples from a slice header of a slice of the picture. This slice comprises the block of samples.

In this embodiment, deriving the QP to use for color transformed blocks of samples is performed according to step S28 or S29. Thus, if the slice transformed offset present flag is equal to one the method continues from step S27 to step S28. This step S28 comprises deriving the QP to use for the at least one color component of the block of samples according to the second QP derivation process based on the QP offset syntax element from the PPS and the QP offset syntax element from the slice header. However, if the slice transform offset flag is equal to zero the method continues from step S26 to step S29. This step S29 comprises deriving the QP to use for the at least one color component of the block of samples according to the second QP derivation process based on the QP offset syntax element from the PPS.

Thus, in this embodiment the QP control information comprises the QP offset syntax element parsed from the PPS ($\Delta QP_{PPS}^{T}$), the slice transform offset flag, and optionally the QP offset syntax element from the slice header ($\Delta QP_{slice}^{T}$). In such a case, the QP is derived in step S28 a function ($f_2(.)$) of these two QP offset syntax elements, i.e. QP=$f_2(\Delta QP_{PPS}^{T}, \Delta QP_{slice}^{T})$. Correspondingly, the QP is derived in step S29 as a function of the QP offset syntax element from the PPS, i.e. QP=$f_2(\Delta QP_{PPS}^{T})$.

In step S29, i.e. when the slice transform offset flag is zero, then the slice header does not comprise any QP offset parameter syntax element valid for color transformed blocks of samples present in the given slice. This is equivalent as setting $\Delta QP_{slice}^{T}=0$. Hence, step S29 could derive the QP as QP=$f_2(\Delta QP_{PPS}^{T}, \Delta QP_{slice}^{T}=0)$.

FIG. 5 also illustrates the processing during QP deriving for non-color-transformed blocks of samples. For such blocks of samples parsing QP control information comprises the steps S20-S22. Step S20 comprises parsing a QP offset syntax element valid for non-color-transformed blocks of samples from a PPS valid for a picture comprising the block of samples. Step S21 comprises parsing a slice chroma offset present flag from the PPS. The following step S22 is performed if the slice chroma offset present flag is equal to one. This step S22 comprises parsing a QP offset syntax element valid for non-color-transformed blocks of samples from a slice header of a slice of the picture. This slice comprises the block of samples. The derivation of the QP to use is then performed according to step S23 or S24. If the slice chroma offset present flag is equal to one the method continues from step S22 to S23. This step S23 comprises deriving the QP to use for the at least one color component of the block of samples according to the first QP derivation process based on the QP offset syntax element from the PPS and the QP offset syntax element from the slice header. If the slice chroma offset present flag is equal to zero the method continues from step S21 to step S24. This step S24 comprises deriving the QP to use for the at least one color component of the block of samples according to the first QP derivation process based on the QP offset syntax element from the PPS.

Thus, in this embodiment the QP control information to use for non-color-transformed blocks of samples comprises the QP offset syntax element parsed from the PPS ($\Delta QP_{PPS}^{NT}$), the slice chroma offset present flag, and optionally the QP offset syntax element from the slice header ($\Delta QP_{slice}^{NT}$). In such a case, the QP is derived in step S23 a function ($f_1(.)$) of these two QP offset syntax elements, i.e. QP=$f_1(\Delta QP_{PPS}^{NT}, \Delta QP_{slice}^{NT})$. Correspondingly, the QP is derived in step S24 as a function of the QP offset syntax element from the PPS, i.e. QP=$f_1(\Delta QP_{PPS}^{NT})$.

In step S24, i.e. when the slice chroma offset present flag is zero then the slice header does not comprise any QP offset parameter syntax element valid for non-color-transformed blocks of samples present in the given slice. This is equivalent as setting $\Delta QP_{slice}^{NT}=0$. Hence, step S24 could derive the QP as QP=$f_1(\Delta QP_{PPS}^{NT}, \Delta Qp_{slice}^{NT}=0)$.

In the above described embodiments, $f_1(.)$ and $f_2(.)$ are used in order to indicate that a first QP derivation process is used for non-color-transformed blocks of samples and a second QP derivation process is used for color transformed blocks of samples. Further, note that different QP offset syntax elements are used for the non-color transformed blocks of samples, $\Delta QP_{PPS}^{NT}$, $\Delta QP_{slice}^{NT}$ and slice chroma offset present flag, as compared to color transformed blocks of samples, $\Delta QP_{PPS}^{T}$, $\neq QP_{slice}^{T}$ and slice transformed offset present flag.

In an embodiment, each sample of the block of samples comprises a luma component Y, i.e. luminance component or first color component, and two chroma components Cb, Cr, i.e. two chrominance components or second and third color component. In such a case, step S2 of FIG. 3 preferably comprises deriving the QP to use for a chroma component Cb (second color component) of the block of samples according to the first QP derivation process as a function of (Qpy+pps_cb_qp_offset+slice_cb_qp_offset) if a flag indicating whether the residual data of the block of samples is color transformed is equal to zero. Correspondingly, step S3 of FIG. 3 preferably comprises deriving the QP to use for the chroma component Cb of the block of samples according to the second QP derivation process as a function of ($Qp_Y$+ pps_transformed_cb_qp_offset+slice_transformed_cb_qp_offset) if the flag is equal to one. In this embodiment, $Qp_Y$ represents a value of a luma QP for the luma component Y. The syntax element pps_cb_qp_offset represents an offset to the luma QP, is present in a PPS valid for a picture comprising the block of samples and is valid for non-color-transformed blocks of samples. The syntax element slice_cb_qp_offset represents an offset to the luma QP, is present in a slice header of a slice of the picture, and is valid for non-color-transformed blocks of samples. This slice comprises the block of samples. The syntax element pps_transformed_cb_qp_offset represents an offset to the luma QP, is present in the PPS and is valid for color transformed blocks of samples. The syntax element slice_transformed_cb_qp_offset represents an offset to the luma QP, is present in the slice header and is valid for color transformed blocks of samples.

This means that the QP to use for the chroma component Cb is calculated based on the QP to use for the luma component Y and QP offset parameters, pps_cb_qp_offset and slice_cb_qp_offset for non-color-transformed blocks of samples and pps_transformed_cb_qp_offset and slice_transformed_cb_qp_offset for color transformed blocks of samples.

Please note that pps_transformed_cb_qp_offset may, but does not have to, be equal to pps_cb_qp_offset and/or slice_transformed_cb_qp_offset may, but does not have to, be equal to slice_cb_qp_offset. However, regardless of the actual values of the QP offset parameters, pps_transformed_cb_qp_offset and slice_transformed_cb_qp_offset are syntax elements valid for color transformed blocks of samples, whereas pps_cb_qp_offset and slice_cb_qp_offset are valid for non-color transformed blocks of samples. This means that a PPS comprises both the syntax element pps_transformed_cb_qp_offset and the syntax element pps_cb_qp_offset.

In an embodiment, the PPS also comprises the flag pps_slice_transformed_qp_offsets_present_flag, sometimes denoted pps_slice_act_qp_offsets_present_flag to signal whether a slice header comprises the syntax element slice_transformed_cb_qp_offset. Correspondingly, the PPS preferably also comprises the flag pps_slice_chroma_qp_offsets_present_flag to signal whether the slice header comprises the syntax element slice_cb_qp_offset.

In a particular embodiment, step S2 of FIG. 3 comprises deriving the QP to use for the chroma component Cb of the block of samples according to the first QP derivation process as $qPi_{Cb}$=Clip3(−$QpBdOffset_C$, 57, Qpy+pps_cb_qp_offset+slice_cb_qp_offset+$CuQpOffset_{Cb}$) if the flag is equal to zero, i.e. if the block of samples is a non-color transformed block of samples. Step S3 then comprises deriving the QP to use for the chroma component Cb of the block Of samples according to the second QP derivation process as $qPi_{Cb}$=Clip3(−$QpBdOffset_C$, 57, Qpy+pps_transformed_cb_qp_offset+slice_transformed_cb_qp_offset+$CuQpOffset_{Cb}$) if the flag is equal to one, i.e. if the block of samples is a color transformed block of samples. In this embodiment, QpBdOffsetc represents a value of a chroma QP range offset, $CuQpOffset_{Cb}$ represents an offset to the luma QP and Clip3(x, y, z) is a function outputting x if z<x, outputting y if z>y and otherwise outputting z.

In the above described embodiments, step S1 is preferably performed as shown in FIG. 5, i.e. comprises the steps S20-S22 and S25-S27. In other words, step S1 comprises parsing, in step S20, S25, pps_cb_qp_offset and pps_transformed_cb_qp_offset from the PPS and parsing, in step S21, S26, a pps_slice_chroma_qp_offsets_present_flag flag and a pps_slice_transformed_qp_offsets_present flag from the PPS. Step S1 also comprises parsing, in step S22 and if the pps_slice_chroma_qp_offsets_present_flag flag is equal to one, slice_cb_qp_offset from the slice header and parsing, in step S27 and if the pps_slice_transformed_qp_offsets_present flag is equal to one, slice_transformed_cb_qp_offset from the slice header.

In another embodiment, relating to deriving the QP for the chroma component Cr, step S2 of FIG. 3 comprises deriving the QP to use for a chroma component Cr (third color component) of the block of samples according to the first QP derivation process as a function of (Qpy +pps_cr_qp_offset +slice_cr_qp_offset) if a flag indicating whether the residual data of the block of samples is color transformed is equal to zero. Correspondingly, step S3 of FIG. 3 preferably comprises deriving the QP to use for the chroma component Cr of the block of samples according to the second QP derivation process as a function of ($Qp_Y$+pps_transformed_cr_qp_offset+slice_transformed_cr_qp_offset) if the flag is equal to one. In this embodiment, $Qp_Y$ represents a value of a luma QP for the luma component Y. The syntax element pps_cr_qp_offset represents an offset to the luma QP, is present in a PPS valid for a picture comprising the block of samples and is valid for non-color-transformed blocks of samples. The syntax element slice_cr_qp_offset represents an offset to the luma QP, is present in a slice header of a slice of the picture, and is valid for non-color-transformed blocks of samples. This slice comprises the block of samples. The syntax element pps_transformed_cr_qp_offset represents an offset to the luma QP, is present in the PPS and is valid for color transformed blocks of samples. The lo syntax element slice_transformed_cr_qp_offset represents an offset to the luma QP, is present in the slice header and is valid for color transformed blocks of samples.

This means that QP to use for the chroma component Cr is calculated based on the QP to use for the luma component Y and QP offset parameters, pps_cr_qp_offset and slice_cr_qp_offset for non-color-transformed blocks of samples and pps_transformed_cr_qp_offset and slice_transformed_cr_qp_offset for color transformed blocks of samples.

As mentioned above for the chroma component Cb, pps_transformed_cr_qp_offset may, but does not have to, be equal to pps_cr_qp_offset and/or slice_transformed_cr_qp_offset may, but does not have to, be equal to slice_cr_qp_offset. However, regardless of the actual values of the QP offset parameters, pps_transformed_cr_qp_offset and slice_transformed_cr_qp_offset are syntax elements valid for color transformed blocks of samples, whereas pps_cr_qp_offset and slice_cr_qp_offset are valid for non-color transformed blocks of samples. This means that a PPS comprises both the syntax element pps_transformed_cr_qp_offset and the syntax element pps_cr_qp_offset.

In a particular embodiment, step S2 of FIG. 3 comprises deriving the QP to use for the chroma component Cr of the block of samples according to the first QP derivation process as $qPi_{Cr}$=Clip3(−$QpBdOffset_C$, 57, $Qp_Y$+pps_cr_qp_offset+slice_cr_qp_offset+$CuQpOffset_{Cr}$) if the flag is equal to zero, i.e. if the block of samples is a non-color transformed block of samples. Step S3 then comprises deriving the QP to use for the chroma component Cr of the block of samples according to the second QP derivation process as $qPi_{Cr}$=Clip3($-$QpBdOffset$_C$, 57, Qp$_Y$+pps_transformed_cr_qp_offset+slice_transformed_cr_qp_offset+CuQpOffset$_{Cr}$) if the flag is equal to one, i.e. if the block of samples is a color transformed block of samples. In this embodiment, QpBdOffset$_C$ represents a value of a chroma QP range offset, CuQpOffset$_{Cr}$ represents an offset to the luma QP and Clip3(x, y, z) is a function outputting x if z<x, outputting y if z>y and otherwise outputting z.

In the above described embodiments, step S1 is preferably performed as shown in FIG. 5, i.e. comprises the steps S20-S22 and S25-S27. In other words, step S1 comprises parsing, in step S20, S25, pps_cr_qp_offset and pps_transformed_cr_qp_offset from the PPS and parsing, in step S21, S26, a pps_slice_chroma_qp_offsets_present_flag flag and a pps_slice_transformed_qp_offsets_present flag from the PPS. Step S1 also comprises parsing, in step S22 and if the pps_slice_chroma_qp_offsets_present_flag flag is equal to one, slice_cr_qp_offset from the slice header and parsing, in step S27 and if the pps_slice_transformed_qp_offsets_present flag is equal to one, slice_transformed_cr_qp_offset from the slice header.

In an embodiment, the presence of QP control information valid for color transformed blocks of samples, i.e. pps_slice_transformed_qp_offsets_present flag, pps_transformed_cb_qp_offset, slice_transformed_cb_qp_offset, pps_transformed_cr_qp_offset, slice_transformed_cr_qp_offset, is conditioned upon a flag used to indicate whether color transformation may be used for residual data of blocks of samples or not. Such a flag is typically denoted residual_adaptive_coplor_transform_enabled_flag and may be present in the PPS or SPS.

In a typical example, QPs are derived both for the chroma component Cb (second color component) and for the chroma component Cr (third color component) for a given block of samples.

In an embodiment, the luma component Y represents or defines a green value G for non-color-transformed blocks of samples and represents a luma value Y for color transformed blocks of samples. The chroma component Cb represents a red value R for non-color-transformed blocks of samples and represents a chroma value Co for color transformed blocks of samples. Correspondingly, the chroma component Cr represents a blue value B for non-color-transformed blocks of samples and represents a chroma value Cg for color transformed blocks of samples.

Hence, in this embodiment non-color-transformed blocks of samples uses the GRB color format or space, whereas color transformed blocks of samples uses the YCoCg color format or space.

The color values of each color component is typically contained in a data structure denoted sample array. This means that the first, second and third sample arrays then carry green, red and blue color values for non-color-transformed blocks of samples. However, for color transformed blocks of samples the first, second and third sample arrays carry luma, chroma and chroma color values, preferably Y, Co and Cg color values or, in another embodiment, Y, Cb and Cr color values.

Another aspect of the embodiments relates to a QP deriving method. The method comprises decoding QP control information in an encoded bitstream to derive non-color-transformed QP offsets and color-transformed QP offsets. The method also comprises deriving QP values for a block of samples based on the non-color-transformed QP offsets or the color transformed QP offsets as conditioned on whether residual data of the block of samples is color transformed or not.

The decoding of the QP control information preferably comprises parsing syntax elements present in the encoded bitstream, preferably in a PPS and/or in a slice header, to get the values of the non-color-transformed QP offsets and color-transformed QP offsets.

The decision of whether to derive the QP values based on the non-color-transformed QP offsets or the color transformed QP offsets is preferably made based on a value of a flag associated with the block of samples.

The above described embodiments of a QP deriving method are preferably performed by a decoder during decoding of pictures of a video bitstream. However, also an encoder performs a decoding process in which encoded residual data is dequantized using the QP and inverse transformed to get reconstructed residual data. Thus, the QP deriving method may also be performed during the reconstruction phase of encoding pictures of a video bitstream.

FIG. 6 is a flow chart illustrating a method for QP coding according to an embodiment. The method comprises determining, in step S30, non-color-transformed QP offsets valid if residual data of a block of samples is not color transformed. Step S31 comprises determining color transformed QP offsets valid if residual data of a block of samples is color transformed. The two steps S30 and S31 can be performed serially in any order or at least partly in parallel. The following step S32 comprises generating QP control information included in an encoded bitstream based on the non-color-transformed QP offsets and the color transformed QP offsets.

Thus, different sets of QP offsets are determined with at least one such set of QP offsets that is valid for non-color-transformed block of samples and at least one set of QP offsets that is valid for color transformed block of samples.

The generation of the QP control information preferably comprises determining syntax elements as disclosed herein that represent the non-color-transformed and the color transformed QP offsets. Step S32 preferably also comprises including or inserting the determined syntax, elements within the encoded bitstream, such as in a PPS and/or slice header.

FIG. 7 is a flow chart illustrating an additional, optional step of the method shown in FIG. 6. The method continues from step S32 in FIG. 6. A next step S40 comprises setting, for a block of samples, a value of a flag in the encoded bitstream equal to one if residual data of the block of samples is color transformed and otherwise setting the value of the flag equal to zero.

This flag is preferably the previously mentioned syntax element cu_residual_act_flag or tu_residual_act_flag depending on whether the block of samples in the form of a CU or a TU.

FIG. 8 is a flow chart illustrating an implementation example of step S31 in FIG. 6. The method, thus, continues from step S30. A next step S50 comprises determining a first set of color transformed QP offsets valid for a first block of samples having residual data that is color transformed. Step S51 comprises determining a second set of color transformed QP offsets valid for a second block of samples having residual data that is color transformed. The first block of samples and the second block of samples belong to different pictures or slices. The method then continues to step S32 of FIG. 6.

This implementation example implies that different values of the QP offsets can be used for different color transformed blocks of samples within a given picture if the two blocks of samples belong to different slices. The QP offsets are then preferably represented by QP offset syntax elements included in respective slice headers. Alternatively, or in addition, the values of QP offsets represented by QP offset syntax elements included in respective PPSs may be different for different pictures in the video stream.

In an embodiment, step S32 of FIG. 6 comprises generating, based on the non-color-transformed QP offsets and the color transformed QP offsets, the QP control information included in a PPS valid for a picture comprising blocks of samples and/or in a slice header of a slice of the picture.

Figure 9:
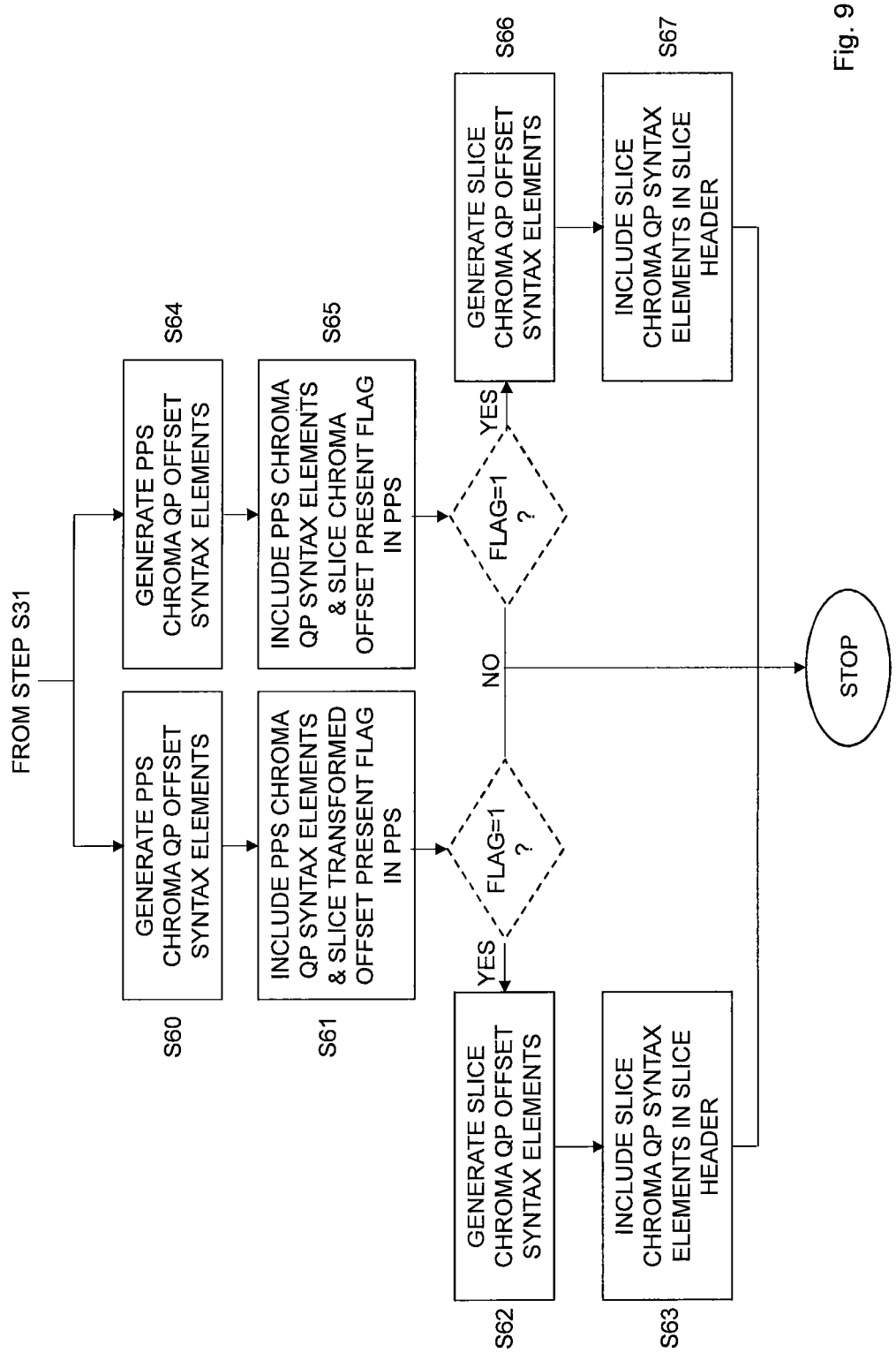
FIG. 9 is a flow chart illustrating an embodiment of the generating step S32 in FIG. 6.

In a particular embodiment, this step S32 is performed as shown in FIG. 9. In FIG. 9, steps S60-S63 apply for color transformed blocks of samples, whereas steps S64-S67 apply for non-color-transformed blocks of samples.

Step S60 comprises generating first chroma QP offset syntax elements valid for color transformed blocks of samples based on the color transformed QP offsets. The following step S61 comprises including the first chroma QP offset syntax elements valid for color transformed blocks of samples in a PPS valid for a picture comprising blocks of samples. Step S61 also comprises including a slice transformed offset present flag in the PPS. The following steps S62 and S63 are performed if the slice transformed offset present flag is equal to one. In such a case, step S62 comprises generating second chroma QP offset syntax elements valid for color transformed blocks of samples based on the color transformed QP offsets. The second chroma QP offset syntax elements valid for color transformed blocks of samples are included in step S63 in a slice header of a slice of the picture.

The first chroma QP syntax elements included in the PPS in step S61 are valid for and used for color transformed blocks of samples present in pictures associated with this PPS, i.e. comprises a PPS identifier identifying the particular PPS in the encoded bitstream. Correspondingly, the second chroma QP syntax elements included in the slice header in step S63 are valid for and used for color transformed blocks of samples present in the relevant slice. This means that first color transformed block of samples present in a first slice in a first picture and a second color transformed block of samples present in a second slice in the first picture may use the same first chroma QP offset syntax elements but different second chroma QP offset syntax elements. Correspondingly, two color transformed blocks of samples present in different pictures associated with different PPSs may use different first and second chroma QP offset syntax elements.

Step S64 comprises generating first chroma QP offset syntax elements valid for non-color-transformed blocks of samples based on the color transformed QP offsets. The following step S65 comprises including the first chroma QP offset syntax elements valid for non-color-transformed blocks of samples in a PPS valid for a picture comprising blocks of samples. Step S65 also comprises including a slice chroma offset present flag in the PPS. The following steps S66 and S67 are performed if the slice chroma offset present flag is equal to one. In such a case, step S66 comprises generating second chroma QP offset syntax elements valid for non-color-transformed blocks of samples based on the color transformed QP offsets. The second chroma QP offset syntax elements valid for non-color-transformed blocks of samples are included in step S67 in a slice header of a slice of the picture.

The above described embodiments of a method for QP coding are preferably performed by an encoder during encoding of pictures of a video stream.

Explicit QP offsets have been a feature available in HEVC since version 1. There are multiple reasons to use explicit QP offsets. When coding GBR video the subjective quality can be substantially improved by optimizing the QP offset of Blue and Red relative to the QP for Green. Which offsets that actually look best is very dependent on the content of the video that is compressed.

However, currently when explicit QP offsets are used, they are applied with the same value regardless if the residual is color transformed or not. This can lead to suboptimal performance. For example, if an encoder would like the Blue color component to be coded with better quality through an explicit QP offset applied to the "Cb channel" then that will also give the Chroma Green better quality in blocks that uses ACT. Having the Chroma Green fidelity (quality) coupled with the Blue fidelity (quality) is not beneficial from an overall subjective quality versus bitrate perspective.

An object with the embodiments is to achieve a solution for improved video compression. That is achieved by applying separate parameters for explicit QP offsets when the residual data is color transformed, This can be done by letting the QP derivation process depend on whether ACT is applied or not. By having the derivation process depend on cu_residual_act_flag (or tu_residual_act_flag) there is no need to send additional data on the block level in order to accomplished the proposed decopupling of explicit QP offset for blocks that are coded with color transform and those that are coded without color transform.

By decoupling the explicit chroma QP offset for blocks that are coded with color transform and those that are coded without color transform it is possible for an encoder to have better control (flexibility) in producing good visual quality.

A key element of the proposed solution is that it makes it possible to have a different explicit QP offset relation between the color components for blocks that are using color transform compared to blocks that do not use color transform.

It should be noted that "QP value" is the value that is used in the decoding process in order to scale the residual coefficients so that they are applied with the correct magnitude.

"QP offset" is the difference in QP value between the primary color component, such as Luma or Green, and another color component and in our case also between a non-color transformed component and a color transformed component.

Herein various implementation examples will be described in more detail.

EXAMPLE 1

In a first example, the decoder checks what color space the residual of the current block is coded in. This is preferably done by checking the value of the flag cu_residual_act_flag (or tu_residual_act_flag). If the cu_residual_act_flag (or tu_residual_act_flag) is equal to 0, the QP value to be used for the current block is derived according to a first process, i.e. equation, and if the cu_residual_act_flag (or tu_residual_act_flag) is equal to 1, the QP value to be used for the current block is derived according to a second process, i.e. equation, such that the derived QP value can, but does not need to, differ from the value that would have been derived using the first process. In order to accomplish the desired decoupling between color transformed and non-color transformed, at least one of these processes should be configurable such that the difference between them is not just a fixed value, i.e. predefined in the specification, but rather something that is controlled by an explicit QP offset that does not affect the other process.

In a preferred version of the first example, there are new syntax elements introduced as QP control information on a sequence level and/or picture level and/or slice level that controls the explicit QP offset for blocks that are coded with color transform.

The decoder performs the following steps during the decoding process of a picture that consists of one or more blocks:
1. The decoder parses one or more values from sequence level information and/or picture level information and/or slice level information which is related to the quantization parameter for blocks that are coded with color transform.
2. For at least one of the color components for at least one of the blocks the decoder derives the value for the quantization parameter to be use based on whether the block is coded with color transform or not.
3. When the block is color transformed the value(s) parsed from sequence level information and/or picture level information and/or slice level is used to derive the quantization parameter.

The steps performed by the decoder can alternatively be expressed as:
1. The decoder parses SPS, PPS and slice header information for the current picture including at least one syntax element (X) that relates to the quantization parameter to be used for blocks with cu_residual_act_flag (or tu_residual_act_flag) equal to 1.
2. The decoder starts decoding at least one current block of at least one coded picture.
3. The decoder parses and/or checks the value of cu_residual_act_flag (or tu_residual_act_flag) for the current block.
4. If cu_residual_act_flag (or tu_residual_act_flag) is equal to 0, the decoder derives the QP to use for the current component of the current block according to a first process that does not depend on X.
5. If cu_residual_act_flag (or tu_residual_act_flag) is equal to 1, the decoder derives the QP to use for the current component of the current block according to a second process that depends on X.

It should be noted that the first process and the second process mentioned above may very well be expressed as being a part of the same process with branching or an if-clause to differentiate between the two processes.

An encoder can use the first example according to the following steps:
1. The encoder encodes SPS, PPS and slice header information for the current picture including at least one syntax element (X) that relates to the quantization parameter to be used for blocks with cu_residual_act_flag (or tu_residual_act_flag) equal to 1.
2. The encoder applies the color transform for at least one component of at least one current block.
3. The encoder uses the information encoded in X when deriving the residual coefficients to be encoded for the current block.

It should be noted that the term "process that depends on X" may refer to direct dependencies or to indirect dependencies, for example in case there is a variable that is derived from X which in turn is used in the process.

EXAMPLE 2

In a second example, the following syntax elements are added to the SCC specification text (highlighted in italics).

In the PPS (in the PPS extension):

| pps_scc_extension( ) { | Descriptor |
|---|---|
| pps_transformed_y_qp_offset | se(v) |
| pps_transformed_cb_qp_offset | se(v) |
| pps_transformed_cr_qp_offset | se(v) |
| pps_slice_transformed_qp_offsets_present_flag | u(1) |
| } | |

In the slice header (slice segment header):

| slice_segment_header( ) { | Descriptor |
|---|---|
| ... | |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( pps_slice_transformed_qp_offsets_present_flag ) { | |
| slice_transformed_y_qp_offset | se(v) |
| slice_transformed_cb_qp_offset | se(v) |
| slice_transformed_cr_qp_offset | se(v) |
| } | |
| ... | |

The decoding process, i.e the derivation process for quantization parameters, is changed as follows: If cu_residual_act_flag[xTbY][yTbY] is equal to 0, the variable $Qp_Y$ is derived as follows:

$$Qp_Y = ((qP_{Y\_PRED} + CuQpDeltaVal + 52 + 2*QpBdOffset_Y)\%(52 + QpBdOffset_Y)) - QpBdOffset_Y$$

Otherwise (cu_residual_act_flag[xTbY][yTbY] is equal to 1), the variable $Qp_Y$ is derived as follows:

$$Qp_Y = ((qP_{Y\_PRED} + CuQpDeltaVal + pps\_transformed\_y\_qp\_offset + slice\_transformed\_y\_qp\_offset + 52 + 2*QpBdOffset_Y)\%(52 + QpBdOffset_Y)) - QpBdOffset_Y$$

When ChromaArrayType is not equal to 0, the following applies.

If cu_residual_act_flag[xTbY][yTbY] is equal to 0, the variables $qP_{Cb}$ and $qP_{Cr}$ are derived as follows:

$$qPi_{Cb} = Clip3(-QpBdOffset_C, 57, Qp_Y + pps\_cb\_qp\_offset + slice\_cb\_qp\_offset + CuQpOffset_{Cb})$$

$$qPi_{Cr} = Clip3(-QpBdOffset_C, 57, Qp_Y + pps\_cr\_qp\_offset + slice\_cr\_qp\_offset + CuQpOffset_{Cr})$$

Otherwise (cu_residual_act_flag[xTbY][yTbY] is equal to 1), the variables $qP_{Cb}$ and $qP_{Cr}$ are derived as follows:

$$qPiCb = Clip3(-QpBdOffset_C, 57, Qp_Y + pps\_transformed\_cb\_qp\_offset + slice\_transformed\_cb\_qp\_offset + CuQpOffset_{Cb})$$

$$qPi_{Cr} = Clip3(-QpBdOffset_C, 57, Qp_Y + pps\_transformed\_cr\_qp\_offset + slice\_transformed\_cr\_qp\_offset + CuQpOffset_{Cr})$$

In another example, the flag cu_residual_act_flag[xTbY][yTbY] is replaced by the flag tu_residual_act_flag[xTbY][yTbY].

The new syntax element added to the PPS and slice header in italics above therefore constitute QP control information as used herein.

EXAMPLE 3

In a third example, the syntax that is used for CU adaptive QP offset is also extended to include syntax elements that are to be used for blocks that are color transformed. This can be realized specifically through introducing three new syntax elements along with as highlighted in italics:

```
if( chroma_qp_offset_list_enabled_flag ) {
    diff_cu_chroma_qp_offset_depth                      ue(v)
    chroma_qp_offset_list_len_minus1                    ue(v)
    for( i = 0; i <= chroma_qp_offset_list_len_minus1; i++ )
    {
        cb_qp_offset_list[i]                            se(v)
        cr_qp_offset_list[i]                            se(v)
        y_transformed_qp_offset_list[i]                 se(v)
        cr_transformed_qp_offset_list[i]                se(v)
        cb_transformed_qp_offset_list[i]                se(v)
    }
}
```

When the QP to be used for the current component of the current block is derived based on information from the CU adaptive offset signaling then that is performed such that the value of cu_residual_act_flag is taken into account and the syntax elements marked in italics above are used when cu_residual_act_flag is equal to 1.

EXAMPLE 4

This fourth example relates to a case in which there are several different color transforms defined. For this case the indication of which color space the residual data is coded in is not represented by a single flag but through some other indication. An example of such an indication is a syntax element that can have more than two different values, i.e. one for each defined color space. In this case the preferred realization of the fourth example is to have new derivation processes defined for each component in each color space. As an example; if two different color transforms would be defined there would be 6 different processes and at least 6 different parameters to be used for deriving which QP to use.

According to this example the decoder would perform the following steps:
1. The decoder parses one or more values from sequence level information and/or picture level information and/or slice level information which is related to the quantization parameter for blocks with residual coded in different color spaces.
2. For at least one of the color components for at least one of the blocks the decoder derives the value for the quantization parameter to be use based on which color space is used for the block.
3. The value(s) parsed from sequence level information and/or picture level information and/or slice level is used to derive the quantization parameter.

EXAMPLE 5

The latest draft of the SCC codec contains a fixed QP offset for blocks that are color transformed. This offset is predefined in the specification and applied to compensate for that the color transform is not normalized. This offset is applied after the normal derivation process of the QP.

This causes two additional problems in addition to the main problem described above:
1. Since there is no clipping operation applied afterwards the value can become out of bounds, i.e. out of the allowed range.
2. It is not possible use some QP values since the offset is applied to a value that has already been clipped. For instance, if the value is higher than or equal to 51 it will be clipped to 51. After that the fixed offset will be applied −3/−5 making the highest possible value to reach be 48/46.

The first problem can be solved by applying an additional clipping after the addition of the fixed offset.

An alternative which solves both these two problems is to apply the fixed offset in the normal derivation process instead of afterwards.

A decoder would perform the following steps:
1. In the derivation process for the QP to use for at least one component in at least one block, the decoder applies the predefined offset before clipping is applied.
2. Clipping is applied after the predefined offset has been applied.

When combined with the decoupling solution described above the QP derivation process would look like this.

The decoding process, i.e. derivation process for quantization parameters, is changed as follows:

If cu_residual_act_flag[xTbY][yTbY] is equal to 0, the variable $Qp_Y$ is derived as follows:

$$Qp_Y = ((qP_{Y\_PRED} + CuQpDeltaVal + 52 + 2 * QpBdOffset_Y) \% (52 + QpBdOffset_Y)) - QpBdOffset_Y$$

Otherwise (cu_residual_act_flag[xTbY][yTbY] is equal to 1), the variable $Qp_Y$ is derived as follows:

$$Qp_Y = ((qP_{Y\_PRED} + CuQpDeltaVal + pps\_transformed\_y\_qp\_offset + slice\_transformed\_y\_qp\_offset + 47 + 2 * QpBdOffset_Y) \% (52 + QpBdOffset_Y)) - QpBdOffset_Y$$

When ChromaArrayType is not equal to 0, the following applies.

If cu_residual_act_flag[xTbY][yTbY] is equal to 0, the variables $qP_{Cb}$ and $qP_{Cr}$ are derived as follows:

$$qPi_{Cb} = Clip3(-QpBdOffset_C, 57, Qp_Y + pps\_cb\_qp\_offset + slice\_cb\_qp\_offset + CuQpOffset_{Cb})$$

$$qPi_{Cr} = Clip3(-QpBdOffset_C, 57, Qp_Y + pps\_cr\_qp\_offset + slice\_cr\_qp\_offset + CuQpOffset_{Cr})$$

Otherwise (cu_residual_act_flag[xTbY][yTbY] is equal to 1), the variables $qP_{Cb}$ and $qP_{Cr}$ are derived as follows:

$$qPi_{Cb} = Clip3(-QpBdOffset_C, 57, Qp_Y + pps\_transformed\_cb\_qp\_offset + slice\_transformed\_cb\_qp\_offset + CuQpOffset_{Cb})$$

$$qPi_{Cr} = Clip3(-QpBdOffset_C, 57, Qp_Y + pps\_transformed\_cr\_qp\_offset + slice\_transformed\_cr\_qp\_offset + 2 + CuQpOffset_{Cr})$$

EXAMPLE 6

In this example, the decoder decodes an encoded representation of at least one picture of a video stream by at least one of the following steps:
1) The decoder is configured to receive at least three sets of different QP offset parameters, where each set of parameters are used in the QP derivation process for transform coefficients.
2) A first set of QP offset parameters is used for the QP derivation process for transform coefficients of a block that is not color transformed. A second and a third set of QP offset parameters are used for the QP offset process for transform coefficients of two different blocks that are color transformed.

3) The second and third set of QP offset parameters are not equal. This means that the derived QP after applying the QP offset parameters from the second and third set on the same input are not equal.
4) The two different blocks of step 2 may belong to different pictures or slices. This means that the pictures or slices that each of the two different blocks of step 2 belong to are associated with a particular set of QP offset parameters for blocks that are color transformed.
5) The sets of QP offset parameters may be signaled per picture or per slice. If the sets of offset parameters are signaled per picture, they may be signaled in the picture parameter set (PPS) and the two different blocks of step 2 may be associated with different picture parameter sets that carry different sets of QP offset parameters that are used for decoding the two different blocks of step 2.
6) The color transformed block may be color transformed from GBR to the YCoCg color format.
7) One set of offset parameters for blocks that are color transformed may define the relative QP values between Y, Co, and Cg sample arrays of the same coding unit or transform unit.
8) One set of offset parameters for blocks that are color transformed may consist of three values, each defining the offset of one of the Y, Co, and Cg sample array.

The decoder may comprise a memory for storing instructions for performing the method according to example 6 and a processor for executing the instructions. The decoder may be implemented in a device such as a network node or user device e.g. a video camera or mobile device.

In this example, the encoder is configured to encode a sequence of at least one picture of a video stream by at least one of the following steps:
1) The encoder is configured to encode at least one set of QP offset parameters for defining the QP derivation process for transform coefficients of blocks that are color transformed. The set of QP offset parameters are signaled either per picture in the picture parameter set (PPS), or per slice in the slice header.
2) The encoder is configured to encode at least one color transformed block and derives the QP values to use for each of the sample arrays of the block by applying the QP offset parameters.
3) The encoder is configured to use the derived QP values for quantizing and inverse quantizing the at least one color transformed block.

The encoder may comprise a memory for storing instructions for performing the method according to example 6 and a processor for executing the instructions. The encoder may be implemented in a device such as a network node or user device e.g. a video camera or mobile device.

EXAMPLE 7

This contribution proposes to add an additional set of QP offset parameters that are applied for coding units that uses the Adaptive Color Transform.

The contribution claims that additional flexibility and improved visual quality can be achieved through the introduction of three new QP offset syntax elements in the PPS and three new QP offset syntax elements in the slice header. The new syntax elements are proposed to be applied when Adaptive Color Transform is used, i.e. when the cu_residual_act_flag is equal to 1. It is asserted that it would be beneficial to be able to separately select which QP to use for Green, Blue, Red, Luma, Chroma Orange and Chroma Green depending on the content of the video and the desired compressed result.

HEVC version 1 includes the possibility to signal offsets to be used for the quantization parameter (QP) of each of the Chroma components relative to the QP used for Luma. This functionality is inherited to the HEVC Screen Content Coding Draft Text 1.

When the SCC draft is used with GBR data, the L sample array is used for holding Green data, the Cb sample array is used for holding Blue data and the Cr sample array is used for holding Red data. In order to adjust the reconstructed quality of the Blue data, an encoder can signal values such that pps_cb_qp_offset+slice_cb_qp_offset is not equal to zero.

Adaptive Colour Transform (ACT) was adopted at the $18^{th}$ JCT-VC meeting to HEVC Screen Content Coding Draft Text 1. ACT enables the use of an additional color transform that is applied on the residual sample arrays. For CUs to which ACT is applied, the resSamplesL sample array is used for holding Luma data, the resSamplesCb sample array is used for holding Chroma Green and resSamplesCr is used for holding Chroma Orange data.

However, for CUs to which ACT is applied, the QP is derived the same way as for CUs that do not use ACT, apart from a fixed offset that compensates for that the color transform is non-normalized. This means that when pps_cb_qp_offset and slice_cb_qp_offset are used to adjust the reconstructed quality of the Blue data, the same offset will also be applied to the Chroma Green data for CUs that uses ACT.

We are proposing to add three new syntax elements to PPS and three new syntax elements to the slice header and to let the QP derivation process depend on the value of cu_residual_act_flag.

The proposed new syntax elements in the PPS would be pps_transformed_y_qp_offset, pps_transformed_cb_qp_offset and pps_transformed_cr_qp_offset.

The proposed new syntax elements in the slice header would be slice_transformed_y_qp_offset, slice_transformed_cb_qp_offset and slice_transformed_cr_qp_offset.

It is proposed that these parameters are applied instead of pps_cb_qp_offset, slice_cb_qp_offset, pps_cr_qp_offset and slice_cr_qp_offset in the derivation process of the QP values to be used in CUs with cu_residual_act_flag equal to 1.

The HEVC Screen Content Coding Draft Text 1 also includes the feature of "CU adaptive Chroma QP offset" inherited from the Range Extension of HEVC. To some extent this can be used to apply different QP offsets for CUs that uses ACT and CUs that do not use ACT. However, in order to use the "CU adaptive Chroma QP offset" for this purpose an encoder would have to signal on the CU level that different QP offsets should be used. The only possibility to do this in the Screen Content Coding Draft Text 1 is to start a new slice whenever the ACT usage (on vs. off) differs from the previous CU. This means that it is only possible at CTU boundaries, and that it comes at a very high bit cost.

Another aspect of the embodiments relates to a decoder. The decoder is configured to parse QP control information valid for a block of samples. The decoder is also configured to derive a QP to use for at least one color component of the block of samples according to a first QP derivation process independent on the QP control information if residual data of the block of samples is not color transformed. The decoder is further configured to derive the QP to use for the at least one color component of the block of samples according to a second QP derivation process dependent on the QP control information if the residual data of the block of samples is color transformed.

In a particular embodiment, the decoder is configured to parse QP control information valid for a picture comprising blocks of samples. The decoder is also configured to derive a QP to use for at least one color component of a first block of samples in the picture according to a first QP derivation process independent on the QP control information. The decoder is further configured to derive the QP to use for the at least one color component of a second block of samples in the picture according to a second QP derivation process dependent on the QP control information. In this embodiment, residual data of the first block of samples is not color transformed, whereas residual data of the second block of samples is color transformed.

In an embodiment, the decoder is configured to derive the QP to use for the at least one color component of the block of samples according to the first QP derivation process independent on the QP control information if a flag indicating whether the residual data of the block of samples is color transformed is equal to zero. In this embodiment, the decoder is configured to derive the QP to use for the at least one color component of the block of samples according to the second QP derivation process dependent on the QP control information if the flag is equal to one.

In an embodiment, the decoder is configured to parse at least three sets of different QP offset parameters. The decoder is also configured to derive the QP to use for the at least one color component according to the first QP derivation process and using a first set of QP offset parameters of the at least three sets of different QP offset parameters. The decoder is further configured to derive the QP to use for the at least one color component according to the second QP derivation process and using a second set or a third set of QP offset parameters of the at least three sets of different QP offset parameters.

In an embodiment, the decoder is configured to derive the QP to use for the at least one color component of a first block of samples according to the second QP derivation process and using the second set of QP offset parameters. The decoder is also configured to derive the QP to use for the at least one color component of a second block of samples according to the second QP derivation process and using the third set of QP offset parameters. The first block of samples and the second block of samples belong to different pictures or slices.

In an embodiment, the decoder is configured to parse the QP control information from PPS information valid for a picture comprising the block of samples and/or slice header information valid for a slice of the picture, wherein the slice comprises the block of samples.

In an embodiment, the decoder is configured to parse a QP offset syntax element valid for color transformed blocks of samples from a PPS valid for a picture comprising the block of samples. The decoder is also configured to parse a slice transformed offset present flag from the PPS. The decoder is further configured to parse, if the slice transformed offset present flag is equal to one, a QP offset syntax element valid for color transformed blocks of samples from a slice header of a slice of the picture. The slice comprises the block of samples. The decoder is further configured to derive the QP to use for the at least one color component of the block of samples according to the second QP derivation process based on the QP offset syntax element from the PPS and the QP offset syntax element from the slice header if the slice transformed offset present flag is equal to one. The decoder is additionally configured to derive the QP to use for the at least one color component of the block of sample according to the second QP derivation process based on the QP offset syntax element from the PPS if the slice transformed offset present flag is equal to zero.

In an embodiment, the decoder is configured to parse a QP offset syntax element valid for non-color-transformed blocks of samples from a PPS valid for a picture comprising the block of samples. The decoder is also configured to parse a slice chroma offset present flag from the PPS. The decoder is further configured to parse, if the slice chroma offset present flag is equal to one, a QP offset syntax element valid for non-color-transformed blocks of samples from a slice header of a slice of the picture. The slice comprises the block of samples. The decoder is further configured to derive the QP to use for the at least one color component of the block of samples according to the first QP derivation process based on the QP offset syntax element from the PPS and the QP offset syntax element from the slice header if the slice chroma offset present flag is equal to one. The decoder is additionally configured to derive the QP to use for the at least one color component of the block of sample according to the first QP derivation process based on the QP offset syntax element from the PPS if the slice chroma offset present flag is equal to zero.

In an embodiment, each sample of the block of samples comprises a luma component Y and two chroma components Cb, Cr. In such a case, the decoder is configured to derive the QP to use for a chroma component Cb of the block of samples according to the first QP derivation process as a function of ($Qp_Y$+pps_cb_qp_offset+slice_cb_qp_offset) if a flag indicating whether the residual data of the block of samples is color transformed is equal to zero. The decoder is also configured to derive the QP to use for the chroma component Cb of the block of samples according to the second QP derivation process as a function of ($Qp_Y$+pps_transformed_cb_qp_offset+slice_transformed_cb_qp_offset) if the flag is equal to one.

In a particular embodiment, the decoder is configured to derive the QP to use for the chroma component Cb of the block of samples according to the first QP derivation process as qPi$_{Cb}$=Clip3(−QpBdOffset$_C$, 57, $Qp_Y$+pps_cb_qp_offset+slice_cb_qp_offset+CuQpOffset$_{Cb}$) if the flag is equal to zero. The decoder is also configured to derive the QP to use for the chroma component Cb of the block of samples according to the second QP derivation process as qPi$_{Cb}$=Clip3(−QpBdOffset$_C$, 57, $Qp_Y$+pps_transformed_cb_qp_offset+slice_transformed_cb_qp_offset+CuQpOffset$_{Cb}$) if the flag is equal to one.

In an embodiment, the decoder is configured to parse pps_cb_qp_offset and pps_transformed_cb_qp_offset from the picture parameter set. The decoder is also configured to parse a pps_slice_chroma_qp_offsets_present_flag flag and a pps_slice_transformed_qp_offsets_present flag from the picture parameter set. The decoder is further configured to parse, if the pps_slice_chroma_qp_offsets_present_flag flag is equal to one, slice_cb_qp_offset from the slice header. The decoder is additionally configured to parse, if the pps_slice_transformed_qp_offsets_present flag is equal to one, slice_transformed_cb_qp_offset from the slice header.

In an embodiment, each sample of the block of samples comprises a luma component Y and two chroma components Cb, Cr. In such an embodiment, the decoder is configured to derive the QP to use for a chroma component Cr of the block of samples according to the first QP derivation process as a function of ($Qp_Y$+pps_cr_qp_offset+slice_cr_qp_offset) if a flag indicating whether the residual data of the block of samples is color transformed is equal to zero. The decoder is configured to derive the QP to use for the chroma component Cr of the block of samples according to the second QP derivation process as a function of (Qp$_Y$+pps_transformed_cr_qp_offset+slice_transformed_cr_qp_offset) if the flag is equal to one, wherein Qp$_Y$ represents a value of a luma QP; pps_cr_qp_offset represents an offset to the luma QP.

In a particular embodiment, the decoder is configured to derive the QP to use for the chroma component Cr of the block of samples according to the first QP derivation process as qPi$_{Cr}$=Clip3(−QpBdOffset$_C$, 57, Qp$_Y$+pps_cr_qp_offset+slice_cr_qp_offset+CuQpOffset$_{Cr}$) if the flag is equal to zero. The decoder is also configured to derive the QP to use for the chroma component Cr of the block of samples according to the second QP derivation process as qPi$_{Cr}$=Clip3(−QpBdOffset$_C$, 57, Qp$_Y$+pps_transformed_cr_qp_offset+slice_transformed_cr_qp_offset+CuQpOffset$_{Cr}$) if the flag is equal to one.

In an embodiment, the decoder is configured to parse pps_cr_qp_offset and pps_transformed_cr_qp_offset from the picture parameter set. The decoder is also configured to parse a pps_slice_chroma_qp_offsets_present flag flag and a pps_slice_transformed_qp_offsets_present flag from the picture parameter set. The decoder is further configured to parse, if the pps_slice_chroma_qp_offsets_present_flag flag is equal to one, slice_cr_qp_offset from the slice header. The decoder is additionally configured to parse, if the pps_slice_transformed_qp_offsets_present flag is equal to one, slice_transformed_cr_qp_offset from the slice header.

The parameters and syntax elements above are as previously defined herein.

In a particular embodiment, the decoder is configured to derive both the QP to use for the chroma component Cb and for the chroma component Cr of the block of samples as described in the foregoing.

A further aspect of the embodiments relates to a decoder. The decoder is configured to decode QP control information in an encoded bitstream to derive non-color-transformed QP offsets and color-transformed QP offsets. The decoder is also configured to derive QP values for a block of samples based on the non-color-transformed QP offsets or the color-transformed QP offsets as conditioned whether residual data of the block of samples is color transformed or not.

In a particular embodiment, the decoder decides to derive the QP values for the block of samples based on the non-color-transformed QP offsets or the color-transformed QP offsets based on a flag retrieved from or parsed in the encoded bitstream for the block of samples. As illustrative examples, this flag may be the previously mentioned cu_residual_act_flag or tu_residual_act_flag depending on whether the block of samples is a CU or a TU.

Yet another aspect of the embodiments relates to an encoder. The encoder is configured to determine non-color-transformed QP offsets valid if residual data of a block of samples is not color transformed. The encoder is also configured to determine color transformed QP offsets valid if residual data of a block of samples is color transformed. The encoder is further configured to generate QP control information included in an encoded bitstream based on the non-color-transformed QP offsets and the color transformed QP offsets.

In an embodiment, the encoder is configured to set, for a block of samples, a value of a flag in the encoded bitstream equal to one if residual data of the block of samples is color transformed and otherwise setting the value of the flag equal to zero.

In an embodiment, the encoder is configured to determine a first set of color transformed QP offsets valid for a first block of samples having residual data that is color transformed. The encoder is also configured to determine a second set of color transformed QP offsets valid for a second block of samples having residual data that is color transformed. The first block of samples and the second block of samples belong to different pictures or slices.

In an embodiment, the encoder is configured to generate, based on the non-color-transformed QP offsets and the color transformed QP offsets, the QP control information included in a PPS valid for a picture comprising blocks of samples and/or in a slice header of a slice of the picture.

In an embodiment, the encoder is configured to generate first chroma QP offset syntax elements valid for color transformed blocks of samples based on the color transformed QP offsets. The encoder is also configured to include the first chroma QP offset syntax elements valid for color transformed blocks of samples in a PPS valid for a picture comprising blocks of samples. The encoder is further configured to include a slice transformed offset present flag in the PPS. The encoder is additionally configured to generate, if the slice transformed offset present flag is equal to one, second chroma QP offset syntax elements valid for color transformed blocks of samples based on the color transformed QP offsets. The encoder is also configured to include, if the slice transformed offset present flag is equal to one, the second chroma QP offset syntax elements valid for color transformed blocks of samples in a slice header of a slice of the picture.

In an embodiment, the encoder is configured to generate first chroma QP offset syntax elements valid for non-color-transformed blocks of samples based on the color transformed QP offsets. The encoder is configured to include the first chroma QP offset syntax elements valid for non-color-transformed blocks of samples in a PPS valid for a picture comprising blocks of samples. The encoder is further configured to include a slice chroma offset present flag in the PPS. The encoder is additionally configured to generate, if the slice chroma offset present flag is equal to one, second chroma QP offset syntax elements valid for non-color-transformed blocks of samples based on the color transformed QP offsets. The encoder is also configured to include, if the slice chroma offset present flag is equal to one, the second chroma QP offset syntax elements valid for non-color-transformed blocks of samples in a slice header of a slice of the picture.

It will be appreciated that the methods, devices and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 10:
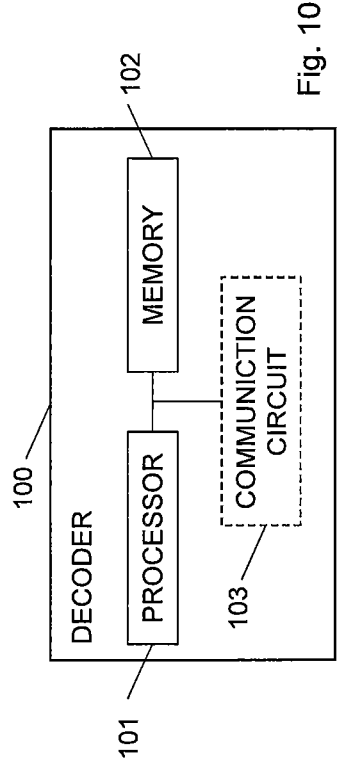
FIG. 10 is a schematic block diagram of a decoder according to an embodiment.

FIG. 10 is a schematic block diagram illustrating an example of a decoder 100, based on a processor-memory implementation according to an embodiment. In this particular example, the decoder 100 comprises a processor 101 and a memory 102. The memory 102 comprises instructions executable by the processor 101, wherein the processor 101 is operative to parse the QP control information and derive the QP to use for the at least one color component of the block of samples according to the first QP derivation process or the second QP derivation process.

In another embodiment, the memory 102 comprises instructions executable by the processor 101, wherein the processor 101 is operative to decode the QP control ,information in the encoded bitstream and derive the QP values for the block of samples based on the non-color-transformed QP offsets or the color transformed QP offsets.

Figure 11:
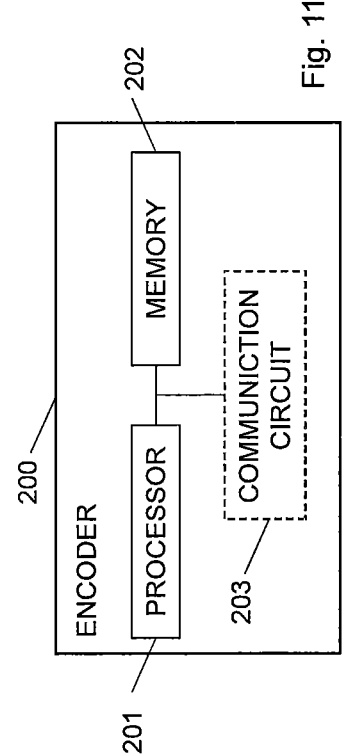
FIG. 11 is a schematic block diagram of an encoder according to an embodiment.

FIG. 11 is a corresponding schematic block diagram illustrating an example of an encoder 200, based on a processor-memory implementation according to an embodiment. In this particular example, the encoder 200 comprises a processor 201 and a memory 202. The memory 202 comprises instructions executable by the processor 201, wherein the processor 201 is operative to determine the non-color-transformed QP offsets and the color transformed QP offsets. The processor 201 is also operative to generate the QP control information based on the non-color-transformed QP offsets and the color transformed QP offsets.

Optionally, the decoder 100 of FIG. 10 and the encoder 200 of FIG. 11 may also include a respective communication circuit 103, 203. The communication circuit 103, 203 may include functions for wired and/or wireless communication with other devices and/or network nodes. In a particular example, the communication circuit 103, 203 may be based on radio circuitry for communication with one or more other nodes, including transmitting and/or receiving information. The communication circuit 103, 203 may be interconnected to the processor 101, 201 and/or memory 102, 202. By way of example, the communication circuit 103, 203 may include any of the following: a receiver, a transmitter, a transceiver, input/output (I/O) circuitry, input port(s) and/or output port(s).

In a particular embodiment, the communication circuit 103 of the decoder 100 in FIG. 10 is configured to receive or input an encoded bitstream. The communication circuit 103 may optionally be configured to transmit or output decoded pictures of a video stream obtained by decoding the encoded bitstream.

The communication circuit 203 of the encoder 200 in FIG. 11 is preferably configured to transmit or output an encoded bitstream. The communication circuit 203 may optionally be configured to receive or input pictures of a video stream to be encoded by the encoder 200 into the encoded bitstream.

Figure 12:
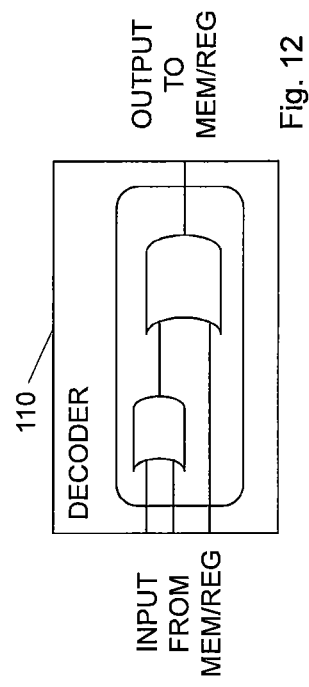
FIG. 12 is a schematic block diagram of a decoder according to another embodiment.
Figure 13:
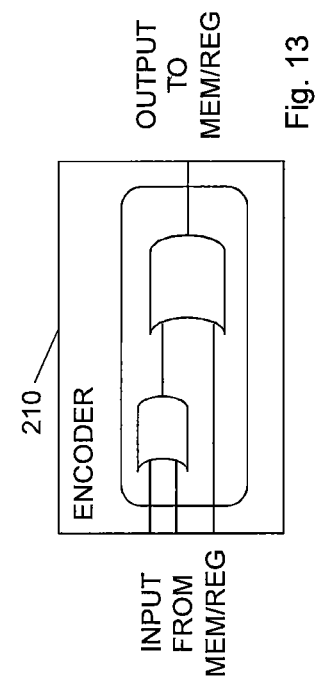
FIG. 13 is a schematic block diagram of an encoder according to another embodiment.

FIGS. 12 and 13 are respective schematic block diagrams illustrating another example of a decoder 110, see FIG. 12, and an encoder 210, see FIG. 13, based on a hardware circuitry implementation according to an embodiment. Particular examples of suitable hardware circuitry include one or more suitably configured or possibly reconfigurable electronic circuitry, e.g. Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIGS. 14 and 15 are respective schematic block diagrams illustrating yet another example of a decoder 120, see FIG. 14, and an encoder 220, see FIG. 15, based on combination of both processor(s) 122, 123; 222, 223 and hardware circuitry 124, 125; 224, 225 in connection with suitable memory unit(s) 121; 221. The decoder 120 and the encoder 220, respectively, comprises one or more processors 122, 123; 222, 223, memory 121; 221 including storage for software (SW) and data, and one or more units of hardware circuitry 124, 125; 224, 225, such as ASICs and/or FPGAs. The overall functionality is thus partitioned between programmed software for execution on one or more processors 122, 123; 222, 223, and one or more pre-configured or possibly reconfigurable hardware circuits 124, 125; 224, 225, such as ASICs and/or FPGAs. The actual hardware-software partitioning can be decided by a system designer based on a number of factors including processing speed, cost of implementation and other requirements.

FIG. 16 is a schematic diagram illustrating an example of a computer-implementation 300 according to an embodiment. In this particular example, at least some of the steps, functions, procedures, modules and/or blocks described herein are implemented in a computer program 340, which is loaded into a memory 320 for execution by processing circuitry including one or more processors 310. The processor(s) 310 and memory 320 are interconnected to each other to enable normal software execution. An optional input/output (I/O) device 330 may also be interconnected to the processor(s) 310 and/or the memory 320 to enable input and/or output of relevant data, such as an encoded bitstream to be decoded and/or decoded pictures of a video bitstream for a decoder-based implementation, and pictures of a video stream to be encoded into an encoded bitstream and/or an encoded bitstream for an encoder-based implementation.

The term 'processor' should be interpreted in a general sense as any system or device capable of executing program code or computer program instructions to perform a particular processing, determining or computing task.

The processing circuitry including one or more processors 310 is thus configured to perform, when executing the computer program 340, well-defined processing tasks such as those described herein.

The processing circuitry does not have to be dedicated to only execute the above-described steps, functions, procedure and/or blocks, but may also execute other tasks.

In a particular embodiment, the computer program 340 comprises instructions, which when executed by at least one processor 310, cause the at least one processor 310 to parse QP control information valid for a block of samples. The at least one processor 310 is also caused to derive a QP to use for at least one color component of the block of samples according to a first QP derivation process independent on the QP control information if residual data of the block of samples is not color transformed. The at least one processor 310 is further caused to derive the QP to use for the at least one color component of the block of samples according to a second QP derivation process dependent on the QP control information if the residual data of the block of samples is color transformed.

In another embodiment, the computer program 340 comprises instructions, which when executed by at least one processor 310, cause the at least one processor 310 to parse QP control information valid for a picture comprising blocks of samples. The at least one processor 310 is also caused to derive a QP to use for at least one color component of a first block of samples in the picture according to a first QP derivation process independent on the QP control information. In this case, residual data of the first block of samples is not color transformed. The at least one processor 310 is further caused to derive the QP to use for the at least one color component of a second block of samples in the picture according to a second QP derivation process dependent on the QP control information. In this case, the residual data of the second block of samples is color transformed.

In a further embodiment, the computer program 340 comprises instructions, which when executed by at least one processor 310, cause the at least one processor 310 to decode QP control information in an encoded bitstream to derive non-color-transformed QP offsets and color-transformed QP offsets. The at least one processor 310 is also caused to derive a QP values for a block of samples based on the non-color-transformed QP offsets or the color transformed QP offsets as conditioned on whether residual data of the block of samples is color transformed or not.

In yet another embodiment, the computer program 340 comprises instructions, which when executed by at least one processor 310, cause the at least one processor 310 to determine non-color-transformed QP offsets valid if residual data of a block of samples is not color transformed. The at least one processor 310 is also caused to determine color transformed QP offsets valid if residual data of a block of samples is color transformed. The at least one processor 310 is further caused to generate QP control information included in an encoded bitstream based on the non-color-transformed QP offsets and the color transformed QP offsets, The proposed technology also provides a carrier 350 comprising the computer program 340, wherein the carrier 350 is one of an electronic signal, an optical signal, an electromagnetic signal, a magnetic signal, an electric signal, a radio signal, a microwave signal, or a computer-readable storage medium.

By way of example, the software or computer program 340 may be realized as a computer program product 350, which is normally carried or stored on a computer-readable medium, in particular a non-volatile medium. Thus, an embodiment relates to a computer-program product 350 comprising a computer-readable medium having stored thereon a computer program 340 as described in the foregoing. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 340 may thus be loaded into the operating memory 320 of a computer or equivalent processing device 300 for execution by the processing circuitry 310 thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 17 is a schematic diagram illustrating an example of a decoder 130. In an embodiment, the decoder 130 comprises an information parsing unit 131 for parsing QP control information valid for a block of samples. The decoder 130 also comprises a QP deriving unit 132 for deriving a QP to use for at least one color component of the block of samples according to a first QP derivation process independent on the QP control information if residual data of the block of samples is not color transformed and deriving the QP to use to the at least one color component of the block of samples according to a second QP derivation process dependent on the QP control information if the residual data of the block of samples is color transformed.

In another embodiment, the decoder 130 comprises an information parsing unit 131 for parsing QP control information valid for a picture comprising blocks of samples. The decoder 130 also comprises a QP deriving unit 132 for deriving a QP to use for at least one color component of a first block of samples in the picture according to a first QP derivation process independent on the QP control information and deriving the QP to use for the at least one color component of a second block of samples in the picture according to a second QP derivation process dependent on the QP control information. In this case, residual data of the first block of samples is not color transformed whereas residual data of the second block of samples is color transformed.

In a further embodiment, a decoder comprises a QP decoding unit for decoding QP control information in an encoded bitstream to derive non-color-transformed QP offsets and color transformed QP offsets. The decoder also comprises a QP deriving unit for deriving QP values for a block of samples based on the non-color-transformed QP offsets or the color transformed QP offsets as conditioned on whether residual data of the block of samples is color transformed or not.

FIG. 18 is a schematic diagram illustrating an example of an encoder 230. The encoder 230 comprises an offset determining unit 231 for determining non-color-transformed QP offsets valid if residual data of a block of samples is not color transformed and color transformed QP offsets valid if residual data of a block of samples is color transformed. The encoder 230 also comprises an information generating unit 232 for generating QP control information included in an encoded bitstream based on the non-color-transformed QP offsets and the color transformed QP offsets.

Alternatively it is possible to realize the modules 131, 132; 231, 232 in FIGS. 17 and 18 predominantly by hardware modules, or alternatively by hardware, with suitable interconnections between relevant modules 131, 132; 231, 232. Particular examples include one or more suitably configured digital signal processors and other known electronic circuits, e.g. discrete logic gates interconnected to perform a specialized function, and/or ASICs as previously mentioned. Other examples of usable hardware include I/O circuitry and/or circuitry for receiving and/or sending signals. The extent of software versus hardware is purely implementation selection.

Figure 19:
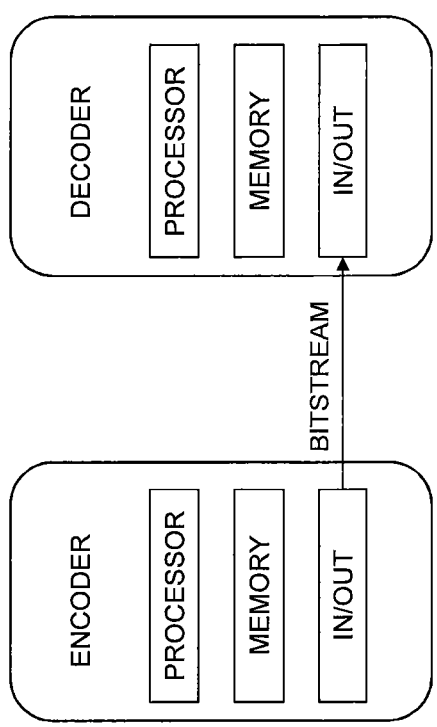
FIG. 19 schematically illustrate communication between an encoder and a decoder according to an embodiment.

According to an aspect, a method in an encoder is provided. The encoder encodes control information including control information for QP, uses the control information when deriving residual coefficients to be encoded for the current block, and sends an encoded bitstream, see FIG. 19.

According to a further aspect an encoder is provided. The encoder is configured to encode control information including control information for QP, to use the control information when deriving residual coefficients to be encoded for the current block, and to send an encoded bitstream, see FIG. 19.

The encoder may comprise a memory for storing instructions for performing the method according to any aspect or embodiment and a processor for executing the instructions. The encoder may be implemented in a device, such as a network node or user device, e.g. a video camera or mobile device.

According to an aspect, a method in a decoder is provided. The decoder receives an encoded bitstream and decodes control information including control information for QP, uses the control information when deriving QP related information to be used for the current component of the current block, wherein the derivation of the QP related information is related to a condition, e.g. whether ACT is used, see FIG. 19.

According to a further aspect a decoder is provided. The decoder is configured to receive an encoded bitstream and to decode control information including control information for QP, and to use the control information when deriving QP related information to be used for the current component of the current block, wherein the derivation of the QP related information is related to a condition, e.g. whether ACT is used, see FIG. 19.

The decoder may comprise a memory for storing instructions for performing the method according to any aspect or embodiment and a processor for executing the instructions. The decoder may be implemented in a device, such as a network node or user device, e.g. a video camera or mobile device.

It is becoming increasingly popular to provide computing services in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Although it may often desirable to centralize functionality in so-called generic data centres, in other scenarios it may in fact be beneficial to distribute functionality over different parts of the network.

Figure 20:
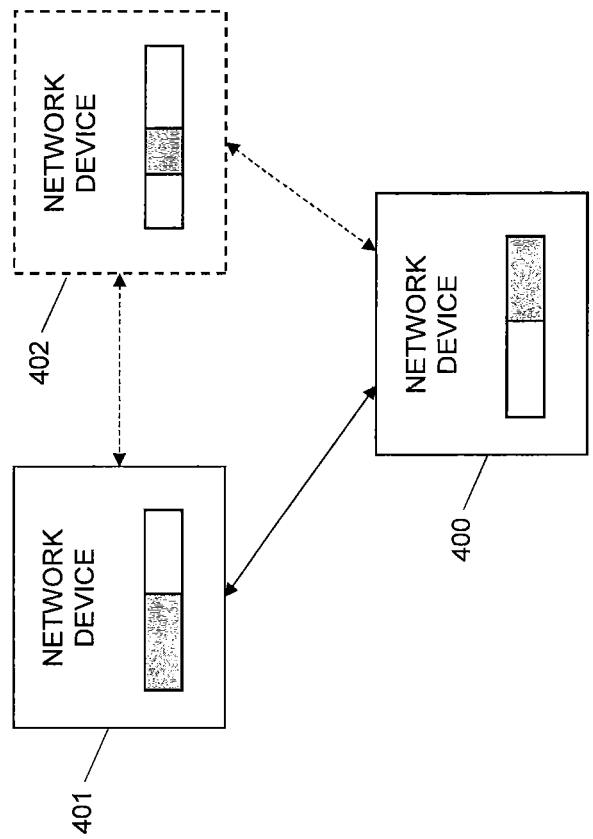
FIG. 20 schematically illustrate a distributed implementation of the embodiments among multiple network devices.

FIG. 20 is a schematic diagram illustrating an example of how functionality, i.e. deriving QP, decoding an encoded bitstream, QP decoding and/or encoding a video bistream into an encoded bitstream, can be distributed or partitioned between different network devices 400, 401 in a general case. In this example, there are at least two individual, but interconnected network devices 400, 401, which may have different functionalities, or parts of the same functionality, partitioned between the network devices 400, 401. There may be additional network devices 402 being part of such a distributed implementation.

The network devices 400, 401, 402 may be part of the same wireless communication system, or one or more of the network devices may be so-called cloud-based network devices located outside of the wireless communication system.

Figure 21:
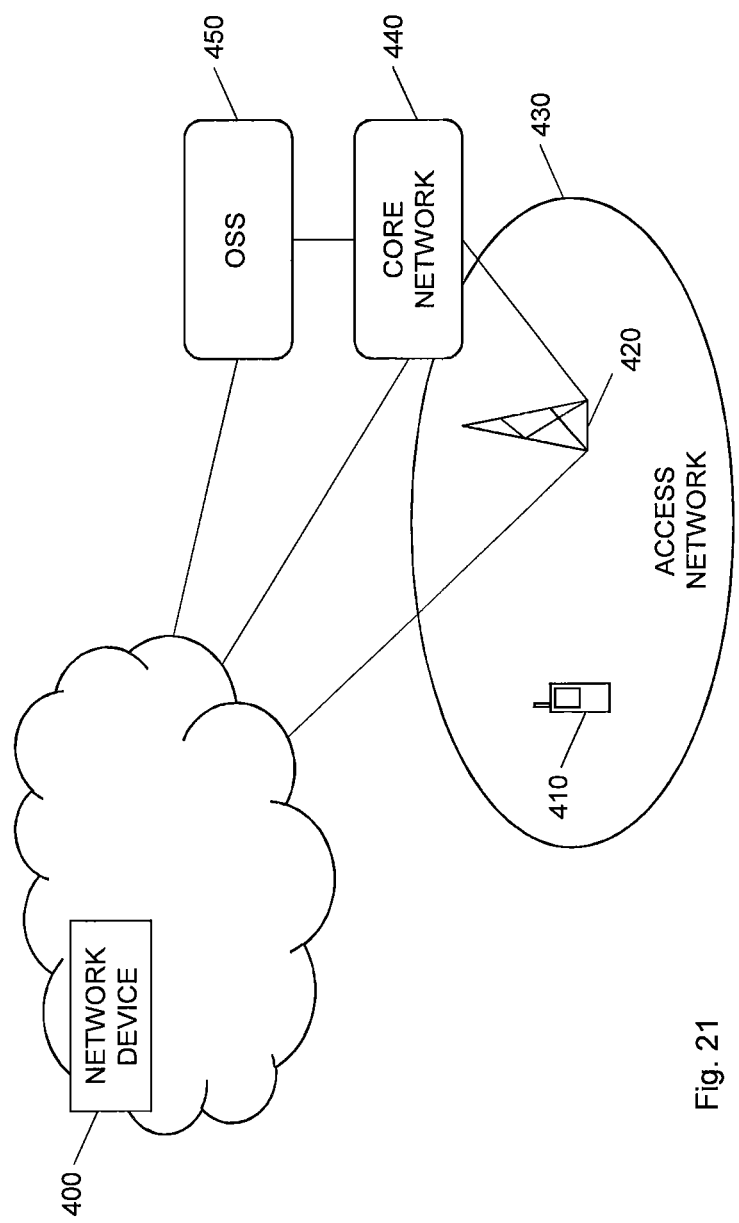
FIG. 21 is a schematic illustration of an example of a wireless communication system with one or more cloud-based network devices according to an embodiment.

FIG. 21 is a schematic diagram illustrating an example of a wireless communication system, including an access network 430 with a network node 420, such as a radio base station, Node-B, evolved Node-B (Node-B) and/or a core network 440 and/or an Operations and Support System (OSS) 450 in cooperation with one or more cloud-based network devices 400. A network device 400 may generally be seen as an electronic device being communicatively connected to other electronic devices in the network.

By way of example, the network device 400 may be implemented in hardware, software or a combination thereof. For example, the network device 400 may be a special-purpose network device or a general purpose network device, or a hybrid thereof.

In an embodiment, the network device 400 comprises a decoder according to the embodiments, such as illustrated in any one of FIG. 10, 12, 14 or 17, and/or an encoder according to the embodiments, such as illustrated in any one of FIG. 11, 13, 15 or 18.

As used herein, the term "network device" may refer to base stations; access points; network control nodes, such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

The figure also illustrates a user device 410, represented by a mobile telephone or smart phone. In an embodiment, the user device 410 comprises a decoder according to the embodiments, such as illustrated in any one of FIG. 10, 12, 14 or 17, and/or an encoder according to the embodiments, such as illustrated in any one of FIG. 11, 13, 15 or 18.

As used herein, the term "user device" may refer to a mobile phone, a cellular phone, a Personal Digital Assistant (PDA), preferably equipped with radio communication capabilities, a smart phone, a laptop or Personal Computer (PC), preferably equipped with an internal or external mobile broadband modem, a tablet, preferably equipped with radio communication capabilities, a video camera, etc.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for processing video data, said method comprising:
   receiving a block of samples of the video data;
   decoding the block of samples of the video data based on quantization parameter (QP) control information associated with the block of samples of the video data, responsive to residual data of the block of samples of video data being color transformed by color transformation, wherein the decoding the block of samples of the video data based on QP control information associated with a block of samples of the video data is performed responsive to a flag associated with the residual data of the block of samples of video data being color transformed being equal to a first bit value; and decoding the block of samples of the video data independent of the QP control information, responsive to residual data of the block of samples of the video data not being color transformed by color transformation, wherein the decoding the block of samples of the video data independent of the QP control information is performed responsive to the flag associated with the residual data of the block of samples of video data being color transformed being equal to a second bit value different from the first bit value;

wherein color transformation is a process of transforming data from one color space to another color space.

2. The method according to claim 1, further comprising:
deriving a quantization parameter (QP) for decoding the block of samples of the video data based on the QP control information.

3. The method according to claim 2, wherein the decoding the block of samples of the video data based on QP control information comprises:
deriving the QP based on the QP control information; and
applying the QP to at least one color component of said block of samples of video data, responsive to the residual data of the block of samples of video data being color transformed.

4. The method of claim 1, further comprising:
parsing information related to QP offset for color transformed blocks from a Sequence Parameter Set (SPS), based on the QP control information,
wherein the parsing the information is performed at a sequence level of the block of samples of video data.

5. The method of claim 1, further comprising:
parsing information related to QP offset for color transformed blocks from a Picture Parameter Set (PPS), based on the QP control information,
wherein the parsing the information is performed at a picture level of the block of samples of video data.

6. The method of claim 1, further comprising:
parsing information related to QP offset for color transformed blocks from a slice header of a picture of the video stream, based on the QP control information.

7. A decoder for processing video data, the decoder comprising:
a processor; and
a memory coupled to the processor and comprising computer readable program code that when executed by the processor causes the processor to perform operations comprising:
receiving a block of samples of the video data;
decoding the block of samples of the video data based on quantization parameter (QP) control information associated with the block of samples of the video data, responsive to residual data of the block of samples of video data being color transformed by color transformation, wherein the decoding the block of samples of the video data based on QP control information associated with a block of samples of the video data is performed responsive to a flag associated with the residual data of the block of samples of video data being color transformed being equal to a first bit value; and
decoding the block of samples of the video data independent of the QP control information, responsive to residual data of the block of samples of the video data not being color transformed by color transformation, wherein the decoding the block of samples of the video data independent of the QP control information is performed responsive to the flag associated with the residual data of the block of samples of video data being color transformed being equal to a second bit value that is different from the first bit value;

wherein color transformation is a process of transforming data from one color space to another color space.

8. The decoder according to claim 7, wherein the processor performs further operations comprising:
deriving a quantization parameter (QP) for decoding the block of samples of the video data based on the QP control information.

9. The decoder according to claim 8, wherein the decoding the block of samples of the video data based on QP control information comprises:
deriving the QP based on the QP control information; and
applying the QP to at least one color component of said block of samples of video data, responsive to the residual data of the block of samples of video data being color transformed.

10. The decoder of claim 7, wherein the processor performs further operations comprising:
parsing information related to QP offset for color transformed blocks from a Sequence Parameter Set (SPS), based on the QP control information,
wherein the parsing the information is performed at a sequence level of the block of samples of video data.

11. The decoder of claim 7, wherein the processor performs further operations comprising:
parsing information related to QP offset for color transformed blocks from a Picture Parameter Set (PPS), based on the QP control information,
wherein the parsing the information is performed at a picture level of the block of samples of video data.

12. The decoder of claim 7, wherein the processor performs further operations comprising:
parsing information related to QP offset for color transformed blocks from a slice header of a picture of the video stream, based on the QP control information.

13. A method for encoding video data, said method comprising:
determining non-color-transformed quantization parameter (QP) offsets valid for residual data of a block of samples of the video data not being color transformed by color transformation;
determining color transformed QP offsets valid for residual data of a block of samples of the video data that is color transformed by color transformation;
selectively encoding a bitstream of the video data based on the non-color-transformed QP offsets and the color transformed QP offsets; and
transmitting the bitstream of the video data that was encoded, wherein color transformation is a process of transforming data from one color space to another color space;
setting, for a block of samples of video data, a value of a flag in the bitstream equal to a first bit value, responsive to the residual data of the block of samples of video data being color transformed; and
setting, for a block of samples of video data, a value of a flag in the bitstream equal to a second bit value that is different from the first bit value, responsive to the residual data of the block of samples of video data not being color transformed.

14. The method according to claim 13, further comprising:

generating QP control information based on the non-color-transformed QP offsets and the color transformed QP offsets.

15. The method according to claim 14, wherein the selectively encoding the bitstream of the video data comprises:
generating an encoded bitstream comprising the QP control information included in a picture parameter set (PPS) valid for a picture comprising blocks of samples of the video data.

16. The method according to claim 14, wherein the selectively encoding the bitstream of the video data comprises:
generating an encoded bitstream comprising the QP control information included in a sequence parameter set (PPS) valid for a picture comprising blocks of samples of the video data.

17. The method according to claim 14, wherein the selectively encoding the bitstream of the video data comprises:
generating an encoded bitstream comprising the QP control information included in a slice header of a slice of a picture comprising blocks of samples of the video data.

18. An encoder for processing video data, the encoder comprising:
a processor; and
a memory coupled to the processor and comprising computer readable program code that when executed by the processor causes the processor to perform operations comprising:
determining non-color-transformed quantization parameter (QP) offsets valid for residual data of a block of samples of the video data that is not being color transformed by color transformation;
determining color transformed QP offsets valid for residual data of a block of samples of the video data that is color transformed by color transformation;
selectively encoding a bitstream of the video data based on the non-color-transformed QP offsets and the color transformed QP offsets;
transmitting the bitstream of the video data that was encoded, wherein color transformation is a process of transforming data from one color space to another color space;
setting, for a block of samples of video data, a value of a flag in the bitstream equal to a first bit value, responsive to the residual data of the block of samples of video data being color transformed; and
setting, for a block of samples of video data, a value of a flag in the bitstream equal to a second bit value that is different from the first bit value, responsive to the residual data of the block of samples of video data not being color transformed.

19. The decoder according to claim 18, wherein the processor further performs operations comprising:
generating QP control information based on the non-color-transformed QP offsets and the color transformed QP offsets.

20. The decoder according to claim 19, wherein the selectively encoding the bitstream of the video data comprises:
generating an encoded bitstream comprising the QP control information included in a picture parameter set (PPS) valid for a picture comprising blocks of samples of the video data.

21. The decoder according to claim 19, wherein the selectively encoding the bitstream of the video data comprises:
generating an encoded bitstream comprising the QP control information included in a sequence parameter set (PPS) valid for a picture comprising blocks of samples of the video data.

22. The decoder according to claim 19, wherein the selectively encoding the bitstream of the video data comprises:
generating an encoded bitstream comprising the QP control information included in a slice header of a slice of a picture comprising blocks of samples of the video data.

* * * * *

UNITED STATES PATENT AND TRADEMARK OFFICE
CERTIFICATE OF CORRECTION

| | | |
|---|---|---|
| PATENT NO. | : 10,091,509 B2 | |
| APPLICATION NO. | : 15/426689 | |
| DATED | : October 2, 2018 | |
| INVENTOR(S) | : Samuelsson et al. | |

It is certified that error appears in the above-identified patent and that said Letters Patent is hereby corrected as shown below:

In the Drawings

In Fig. 18, Sheet 8 of 10, for Tag "232", in Lines 1-3, delete "INFORMATION DETERMINING UNIT" and insert -- INFORMATION GENERATING UNIT --, therefor.

In the Specification

In Column 1, Line 8, delete "2015," and insert -- 2015, now Pat. No. 9,609,362, --, therefor.

In Column 2, Line 59, delete "level," and insert -- level. --, therefor.

In Column 2, Line 62, delete "pps_cb_qp_offset," and insert -- pps_cb_qp_offset, slice_cb_qp_offset, --, therefor.

In Column 3, Line 19, delete "Saporo," and insert -- Sapporo, --, therefor.

In Column 3, Line 32, delete "method," and insert -- method. --, therefor.

In Column 4, Line 3, delete "GP" and insert -- QP --, therefor.

In Column 4, Line 66, delete "lo makes" and insert -- makes --, therefor.

In Column 6, Line 38, delete "illustrate" and insert -- illustrates --, therefor.

In Column 6, Line 39, delete "may divided" and insert -- may be divided --, therefor.

In Column 7, Line 65, delete "step. S1" and insert -- step S1 --, therefor.

In Column 8, Line 16, delete "residual adaptive_color transform_enabled_flag" and insert -- residual_adaptive_color_transform_enabled_flag --, therefor.

Signed and Sealed this
Twenty-sixth Day of March, 2019

Andrei Iancu
*Director of the United States Patent and Trademark Office*

CERTIFICATE OF CORRECTION (continued)
U.S. Pat. No. 10,091,509 B2

In Column 8, Line 28, delete "need" and insert -- need to --, therefor.

In Column 8, Line 51, delete "not," and insert -- not. --, therefor.

In Column 10, Line 48, delete "$\Delta QP_{slice}^{NT}=0).$" and insert -- $\Delta QP_{slice}^{NT}=0).$ --, therefor.

In Column 10, Line 57, delete "$\Delta QP_{PPS}^{T}, \neq QP_{slice}^{T}$" and insert -- $\Delta QP_{PPS}^{T}, \Delta QP_{slice}^{T}$ --, therefor.

In Column 10, Line 67, delete "(Qpy+" and insert -- (Qp$_Y$+ --, therefor.

In Column 11, Line 45, delete "pps_slice_act qp_offsets_present_flag" and insert -- pps_slice_act_qp_offsets_present_flag --, therefor.

In Column 11, Line 54, delete "Qpy+" and insert -- Qp$_Y$+ --, therefor.

In Column 11, Line 58, delete "Of" and insert -- of --, therefor.

In Column 11, Line 60, delete "Qpy+" and insert -- Qp$_Y$+ --, therefor.

In Column 11, Line 64, delete "QpBdOffsetc" and insert -- QpBdOffset$_C$ --, therefor.

In Column 12, Line 18, delete "(Qpy" and insert -- (Qp$_Y$ --, therefor.

In Column 12, Line 37, delete "lo syntax" and insert -- syntax --, therefor.

In Column 13, Line 24, delete "ce_transformed_qp_offsets_present flag," and insert -- ce_transformed_qp_offsets_present_flag, --, therefor.

In Column 13, Line 30, delete "adaptive_coplor_transform_enabled_flag" and insert -- adaptive_color_transform_enabled_flag --, therefor.

In Column 13, Line 47, delete "GRB" and insert -- GBR --, therefor.

In Column 16, Line 20, delete "transformed," and insert -- transformed. --, therefor.

In Column 19, Line 65, delete "use" and insert -- to use --, therefor.

In Column 22, Line 17, delete "18$^{th}$JCT-VC" and insert -- 18$^{th}$ JCT-VC --, therefor.

In Column 25, Line 23, delete "pps_slice_chroma_qp_offsets_present flag" and insert -- pps_slice_chroma_qp_offsets_present_flag --, therefor.

In Column 27, Line 22, delete "control ," and insert -- control --, therefor.

CERTIFICATE OF CORRECTION (continued)
U.S. Pat. No. 10,091,509 B2

In Column 29, Line 33, delete "offsets," and insert -- offsets. --, therefor.

In the Claims

In Column 34, Line 52, in Claim 13, delete "offsets; and" and insert -- offsets; --, therefor.

In Column 35, Line 16, in Claim 16, delete "(PPS)" and insert -- (SPS) --, therefor.

In Column 36, Line 14, in Claim 19, delete "decoder" and insert -- encoder --, therefor.

In Column 36, Line 19, in Claim 20, delete "decoder" and insert -- encoder --, therefor.

In Column 36, Line 26, in Claim 21, delete "decoder" and insert -- encoder --, therefor.

In Column 36, Line 31, in Claim 21, delete "(PPS)" and insert -- (SPS) --, therefor.

In Column 36, Line 33, in Claim 22, delete "decoder" and insert -- encoder --, therefor.